US011147008B2

(12) United States Patent
Montojo et al.

(10) Patent No.: US 11,147,008 B2
(45) Date of Patent: Oct. 12, 2021

(54) TRANSMISSION OF PHYSICAL BROADCAST CHANNEL FOR NEW RADIO

(71) Applicant: QUALCOMM incorporated, San Diego, CA (US)

(72) Inventors: Juan Montojo, San Diego, CA (US); Wanshi Chen, San Diego, CA (US); Tao Luo, San Diego, CA (US); Heechoon Lee, San Diego, CA (US); Peter Pui Lok Ang, San Diego, CA (US); Peter Gaal, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/189,742

(22) Filed: Nov. 13, 2018

(65) Prior Publication Data

US 2019/0150068 A1 May 16, 2019

Related U.S. Application Data

(60) Provisional application No. 62/588,229, filed on Nov. 17, 2017, provisional application No. 62/586,794, filed on Nov. 15, 2017.

(51) Int. Cl.
*H04W 72/04* (2009.01)
*H04W 56/00* (2009.01)
(Continued)

(52) U.S. Cl.
CPC ........... *H04W 48/12* (2013.01); *H04L 5/0023* (2013.01); *H04L 5/0046* (2013.01);
(Continued)

(58) Field of Classification Search
CPC ..... H04L 5/001; H04L 5/0053; H04L 1/1896; H04L 5/0023; H04L 5/14; H04L 1/0072;
(Continued)

(56) References Cited

U.S. PATENT DOCUMENTS 10,362,525 B2\* 7/2019 Miao .................. H04B 7/15542
2013/0003672 A1\* 1/2013 Dinan .................. H04L 5/0053
370/329

(Continued)

OTHER PUBLICATIONS

International Search Report and Written Opinion—PCT/US2018/061041—ISA/EPO—dated Apr. 8, 2019.
(Continued)

*Primary Examiner* — Sai Aung

(74) *Attorney, Agent, or Firm* — Holland & Hart LLP

(57) ABSTRACT

Methods, systems, and devices for wireless communications are described. In one example, a method includes selecting between a first frequency range and a second frequency range to transmit a physical channel, the second frequency range being higher than the first frequency range, and jointly encoding at least two fields of the physical channel based at least in part on the selected frequency range. In some cases, the method includes selecting between a first frequency range and a second frequency range to transmit a physical channel. In some cases, the second frequency range is higher than the first frequency range. The method may further
(Continued)

include adjusting a quantity of bits associated with a field of the physical channel based at least in part on the selected frequency range.

30 Claims, 27 Drawing Sheets

(51) Int. Cl.
    *H04L 5/00*     (2006.01)
    *H04W 48/12*     (2009.01)
    *H04W 28/26*     (2009.01)
    *H04L 27/26*     (2006.01)
    *H04L 27/00*     (2006.01)

(52) U.S. Cl.
    CPC ...... *H04L 27/2602* (2013.01); *H04L 27/2657* (2013.01); *H04L 27/2666* (2013.01); *H04W 28/26* (2013.01); *H04W 72/042* (2013.01); *H04W 72/0453* (2013.01); *H04L 2027/0018* (2013.01)

(58) Field of Classification Search
    CPC . H04L 27/2666; H04L 5/0048; H04L 5/0055; H04L 5/1469; H04L 1/00; H04L 1/0046; H04L 1/1607
    See application file for complete search history.

(56) References Cited

U.S. PATENT DOCUMENTS

| | | | |
|---|---|---|---|
| 2014/0119316 A1* | 5/2014 | Linden | H04L 5/0044 370/329 |
| 2015/0207578 A1* | 7/2015 | Ramamurthy | H04W 72/0453 370/338 |
| 2016/0050676 A1 | 2/2016 | Sinnaduray et al. | |
| 2016/0128045 A1* | 5/2016 | Azarian Yazdi | H04W 72/0406 370/330 |
| 2016/0183276 A1 | 6/2016 | Marinier et al. | |
| 2016/0352551 A1* | 12/2016 | Zhang | H04L 5/0007 |
| 2017/0324508 A1* | 11/2017 | Vanninen | H04L 27/0008 |
| 2018/0098223 A1* | 4/2018 | Hugl | H04L 5/0044 |
| 2019/0191453 A1* | 6/2019 | Xiong | H04L 5/0037 |
| 2019/0208482 A1 | 7/2019 | Tooher et al. | |
| 2019/0288811 A1* | 9/2019 | Chang | H04L 1/0041 |
| 2020/0187256 A1* | 6/2020 | Lim | H04W 72/042 |

OTHER PUBLICATIONS

Partial International Search Report—PCT/US2018/061041—ISA/EPO—dated Jan. 31, 2019.

* cited by examiner

| PBCH payload | sub-6 | above-6 |
|---|---|---|
| SFN | 10 | 10 |
| Half-frame indicator | 1 | 1 |
| SSB index | 0 | 3 |
| PRB grid offset | 4 | 4 |
| Default DL numerology | 1 | 1 |
| RMSI config | 8 | 8 |
| Front loaded DMRS | 1 | 1 |
|  |  |  |
| Cell barring | 1 | 1 |
| Cell reselection | 1 | 1 |
|  |  |  |
| Reserved | 5 | 2 |
| CRC | 24 | 24 |
|  |  |  |
| Total | 56 | 56 |

FIG. 3A

| PBCH payload | sub-6 | above-6 |
|---|---|---|
| SFN | 10 | 10 |
| Half-frame indicator | 1 | 1 |
| SSB index | 0 | 3 |
| PRB grid offset | 4 | 4 |
| Default DL numerology | 1 | 1 |
| RMSI config | 8 | 5 |
| Front loaded DMRS | 1 | 1 |
|  |  |  |
| Cell barring | 1 | 1 |
| Cell reselection | 1 | 1 |
|  |  |  |
| Reserved | 5 | 5 |
| CRC | 24 | 24 |
|  |  |  |
| Total | 56 | 56 |

FIG. 3B

| Frequency | SSB | RMSI | Number of offset options |
|---|---|---|---|
| sub-6 | 30 | 30 | 12 |
| | 30 | 15 | 24 |
| | 15 | 30 | 6 |
| | 15 | 15 | 12 |
| above-6 | 240 | 120 | 24 |
| | 240 | 60 | 0 |
| | 120 | 120 | 12 |
| | 120 | 60 | 24 |

— 700

| Frequency | SSB | RMSI | Number of offset options |
|---|---|---|---|
| sub-6 | 30 | 30 | 12 |
| | 30 | 15 | 12 |
| | 15 | 30 | 6 |
| | 15 | 15 | 12 |
| above-6 | 240 | 120 | 12 |
| | 240 | 60 | 12 |
| | 120 | 120 | 12 |
| | 120 | 60 | 12 |

750

TRANSMISSION OF PHYSICAL BROADCAST CHANNEL FOR NEW RADIO

CROSS REFERENCES

The present Application for Patent claims the benefit of U.S. Provisional Patent Application No. 62/586,794 by MONTOJO, et al., entitled "TRANSMISSION OF PHYSICAL BROADCAST CHANNEL FOR NEW RADIO," filed Nov. 15, 2017, and to U.S. Provisional Patent Application No. 62/588,229 by MONTOJO, et al., entitled "TRANSMISSION OF PHYSICAL BROADCAST CHANNEL FOR NEW RADIO" filed Nov. 17, 2017, assigned to the assignee hereof, and expressly incorporated herein.

BACKGROUND

The following relates generally to wireless communication, and more specifically to transmission of physical broadcast channel (PBCH) for New Radio (NR).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications systems may operate in multiple frequency ranges such as millimeter wave (mmW) frequency ranges and sub-6 frequency ranges. In some cases, transmissions from the base station and the UE may be beamformed. That is, wireless communication between a base station and a UE, may use beams or beamformed signals for transmission or reception. A base station may transmit beamformed signals on one or more downlink transmission beams, and a UE may receive a signal on one or more downlink receive beams. Similarly, a UE may transmit beamformed signals on one or more uplink transmission beams, and a base station may receive beamformed signals on one or more uplink receive beams.

SUMMARY

The described techniques relate to improved methods, systems, devices, or apparatuses that support transmission of physical broadcast channel (PBCH) for New Radio (NR). For example, the described techniques allow a base station (e.g., next generation NodeBs (gNB)) to jointly encode two fields of a PBCH prior to transmitting it to a user equipment (UE). The described techniques may additionally or alternatively allow a base station to size match a PBCH prior to transmitting it to a UE. Specifically, a base station may be configured to select between a first frequency range and a second frequency range to transmit a physical channel. In some examples, the physical channel may be a PBCH. Prior to transmitting the PBCH, the base station 105 may jointly encode at least two fields of the physical channel based on the selected frequency range. In some examples, the two fields may be a default downlink (DL) numerology field and a physical resource block (PRB) grid offset field of the physical channel. In some cases, the base station may jointly encode the fields using 5 bits. In some examples, the base station may be configured to jointly encode any two fields of the PBCH. Such joint encoding may enable the base station to convey more information than sending the information separately using non-encoded bits. In some examples, prior to transmitting the PBCH, the base may adjust a number of bits associated with a field of the PBCH in order to size match. More specifically, the base station may determine that the PBCH is to be transmitted on an above-6 or millimeter wave (mmW)) frequency range. Upon determining that the PBCH is to be transmitted on an above-6 frequency range, the base station may adjust the payload of the PBCH, in order to size match the payload of the PBCH with a payload of a PBCH in sub-6 frequency range. In some examples, the base station may reduce the number of bits in a reserved field of the PBCH. In some examples, the reserved bit field may be used to trigger a reinterpretation of the PBCH payload in a different field structure. In some cases, the base station may not alter the number of bits in the reserved field and may reduce the number of bits in a remaining minimum system information (RMSI) config. field of the PBCH.

A method of wireless communication is described. The method may include selecting between a first frequency range and a second frequency range to transmit a physical channel, the second frequency range being higher than the first frequency range and jointly encoding at least two fields of the physical channel based on the selected frequency range.

An apparatus for wireless communication is described. The apparatus may include means for selecting between a first frequency range and a second frequency range to transmit a physical channel, the second frequency range being higher than the first frequency range and means for jointly encoding at least two fields of the physical channel based on the selected frequency range.

Another apparatus for wireless communication is described. The apparatus may include a processor, memory in electronic communication with the processor, and instructions stored in the memory. The instructions may be operable to cause the processor to select between a first frequency range and a second frequency range to transmit a physical channel, the second frequency range being higher than the first frequency range and jointly encode at least two fields of the physical channel based on the selected frequency range.

A non-transitory computer-readable medium for wireless communication is described. The non-transitory computer-readable medium may include instructions operable to cause a processor to select between a first frequency range and a second frequency range to transmit a physical channel, the second frequency range being higher than the first frequency range and jointly encode at least two fields of the physical channel based on the selected frequency range.

Some examples of the method, apparatus, and non-transitory computer-readable medium described above may further include processes, features, means, or instructions for jointly encoding a default DL numerology field with a PRB grid offset field of the physical channel.

Some examples of the method, apparatus, and non-transitory computer-readable medium described above may further include processes, features, means, or instructions for jointly encoding the at least two fields of the physical channel using 5 bits.

In some examples of the method, apparatus, and non-transitory computer-readable medium described above, the 5 bits indicate a numerology of an RMSI and an offset between a sync signal block (SSB) resource block (RB) grid and a common PRB grid.

Some examples of the method, apparatus, and non-transitory computer-readable medium described above may further include processes, features, means, or instructions for identifying a numerology of an SSB.

In some examples of the method, apparatus, and non-transitory computer-readable medium described above, the 5 bits indicate a subset of possible offsets between the SSB RB grid and the common PRB grid based on the identified numerology of the SSB and the numerology of the RMSI.

In some examples of the method, apparatus, and non-transitory computer-readable medium described above, a field from the at least two fields of the physical channel or a jointly encoded field of the physical channel includes an indication of an RMSI associated with an SSB.

In some examples of the method, apparatus, and non-transitory computer-readable medium described above, one or more available bits in a PRB grid offset field comprises an indication of no RMSI being associated with an SSB.

In some examples of the method, apparatus, and non-transitory computer-readable medium described above, the numerology of the RMSI indicates a subcarrier spacing (SCS) of the physical channel carrying the RMSI in the first frequency range or an SCS of the physical channel carrying the RMSI in the second frequency range.

In some examples of the method, apparatus, and non-transitory computer-readable medium described above, the first frequency range includes 15 kHz or 30 kHz SCS and the second frequency range includes 60 kHz or 120 kHz SCS. In some examples of the method, apparatus, and non-transitory computer-readable medium described above, the physical channel includes a PBCH.

A method of wireless communication is described. The method may include receiving a transmission of a physical channel on a first frequency range or a second frequency range, the second frequency range being higher than the first frequency range and decoding at least two fields of the physical channel that were jointly encoded as a single field based on a frequency range used to transmit the physical channel.

An apparatus for wireless communication is described. The apparatus may include means for receiving a transmission of a physical channel on a first frequency range or a second frequency range, the second frequency range being higher than the first frequency range and means for decoding at least two fields of the physical channel that were jointly encoded as a single field based on a frequency range used to transmit the physical channel.

Another apparatus for wireless communication is described. The apparatus may include a processor, memory in electronic communication with the processor, and instructions stored in the memory. The instructions may be operable to cause the processor to receive a transmission of a physical channel on a first frequency range or a second frequency range, the second frequency range being higher than the first frequency range and decode at least two fields of the physical channel that were jointly encoded as a single field based on a frequency range used to transmit the physical channel.

A non-transitory computer-readable medium for wireless communication is described. The non-transitory computer-readable medium may include instructions operable to cause a processor to receive a transmission of a physical channel on a first frequency range or a second frequency range, the second frequency range being higher than the first frequency range and decode at least two fields of the physical channel that were jointly encoded as a single field based on a frequency range used to transmit the physical channel.

In some examples of the method, apparatus, and non-transitory computer-readable medium described above, the at least two fields include a default DL numerology field and a PRB grid offset field. In some examples of the method, apparatus, and non-transitory computer-readable medium described above, the at least two fields may be jointly encoded using 5 bits.

Some examples of the method, apparatus, and non-transitory computer-readable medium described above may further include processes, features, means, or instructions for identifying a numerology of an RMSI and an offset between an SSB RB grid and a common PRB grid based on the 5 bits.

In some examples of the method, apparatus, and non-transitory computer-readable medium described above, a field from the at least two fields of the physical channel or the jointly encoded field of the physical channel includes an indication of an RMSI associated with an SSB.

In some examples of the method, apparatus, and non-transitory computer-readable medium described above, the first frequency range includes 15 kHz or 30 kHz SCS and the second frequency range includes 60 kHz or 120 kHz SCS. In some examples of the method, apparatus, and non-transitory computer-readable medium described above, the physical channel includes a PBCH.

A method of wireless communication is described. The method may include selecting between a first frequency range and a second frequency range to transmit a physical channel, the second frequency range being higher than the first frequency range and adjusting a quantity of bits associated with a field of the physical channel based on the selected frequency range.

An apparatus for wireless communication is described. The apparatus may include means for selecting between a first frequency range and a second frequency range to transmit a physical channel, the second frequency range being higher than the first frequency range and means for adjusting a quantity of bits associated with a field of the physical channel based on the selected frequency range.

Another apparatus for wireless communication is described. The apparatus may include a processor, memory in electronic communication with the processor, and instructions stored in the memory. The instructions may be operable to cause the processor to select between a first frequency range and a second frequency range to transmit a physical channel, the second frequency range being higher than the first frequency range and adjust a quantity of bits associated with a field of the physical channel based on the selected frequency range.

A non-transitory computer-readable medium for wireless communication is described. The non-transitory computer-readable medium may include instructions operable to cause a processor to select between a first frequency range and a second frequency range to transmit a physical channel, the second frequency range being higher than the first frequency range and adjust a quantity of bits associated with a field of the physical channel based on the selected frequency range.

Some examples of the method, apparatus, and non-transitory computer-readable medium described above may further include processes, features, means, or instructions for relatively reducing the quantity of bits associated with the field of the physical channel. In some examples of the method, apparatus, and non-transitory computer-readable medium described above, the field includes a field of reserved bits of the physical channel. In some examples of the method, apparatus, and non-transitory computer-readable medium described above, the field of reserved bits of the physical channel includes an indication of a field structure associated with the physical channel.

In some examples of the method, apparatus, and non-transitory computer-readable medium described above, the field includes an RMSI related configuration field. In some examples of the method, apparatus, and non-transitory computer-readable medium described above, the first frequency range includes 15 kHz or 30 kHz SCS and the second frequency range includes 60 kHz or 120 kHz SCS.

A method of wireless communication is described. The method may include identifying a received transmission of a physical channel as being received on a first frequency range or a second frequency range, the second frequency range being higher than the first frequency range and identifying a field of the physical channel that includes an adjusted quantity of bits based on the identified frequency range.

An apparatus for wireless communication is described. The apparatus may include means for identifying a received transmission of a physical channel as being received on a first frequency range or a second frequency range, the second frequency range being higher than the first frequency range and means for identifying a field of the physical channel that includes an adjusted quantity of bits based on the identified frequency range.

Another apparatus for wireless communication is described. The apparatus may include a processor, memory in electronic communication with the processor, and instructions stored in the memory. The instructions may be operable to cause the processor to identify a received transmission of a physical channel as being received on a first frequency range or a second frequency range, the second frequency range being higher than the first frequency range and identify a field of the physical channel that includes an adjusted quantity of bits based on the identified frequency range.

A non-transitory computer-readable medium for wireless communication is described. The non-transitory computer-readable medium may include instructions operable to cause a processor to identify a received transmission of a physical channel as being received on a first frequency range or a second frequency range, the second frequency range being higher than the first frequency range and identify a field of the physical channel that includes an adjusted quantity of bits based on the identified frequency range.

In some examples of the method, apparatus, and non-transitory computer-readable medium described above, the field includes a field of reserved bits of the physical channel. In some examples of the method, apparatus, and non-transitory computer-readable medium described above, the field includes an RMSI related configuration field.

In some examples of the method, apparatus, and non-transitory computer-readable medium described above, the first frequency range includes 15 kHz or 30 kHz SCS and the second frequency range includes 60 kHz or 120 kHz SCS.

BRIEF DESCRIPTION OF THE DRAWINGS

FIG. 3A illustrates an example of a size matching of PBCH payload that supports transmission of PBCH for NR in accordance with aspects of the present disclosure.

FIG. 3B illustrates an example of a size matching of PBCH payload that supports transmission of PBCH for NR in accordance with aspects of the present disclosure.

DETAILED DESCRIPTION

Figure 1:
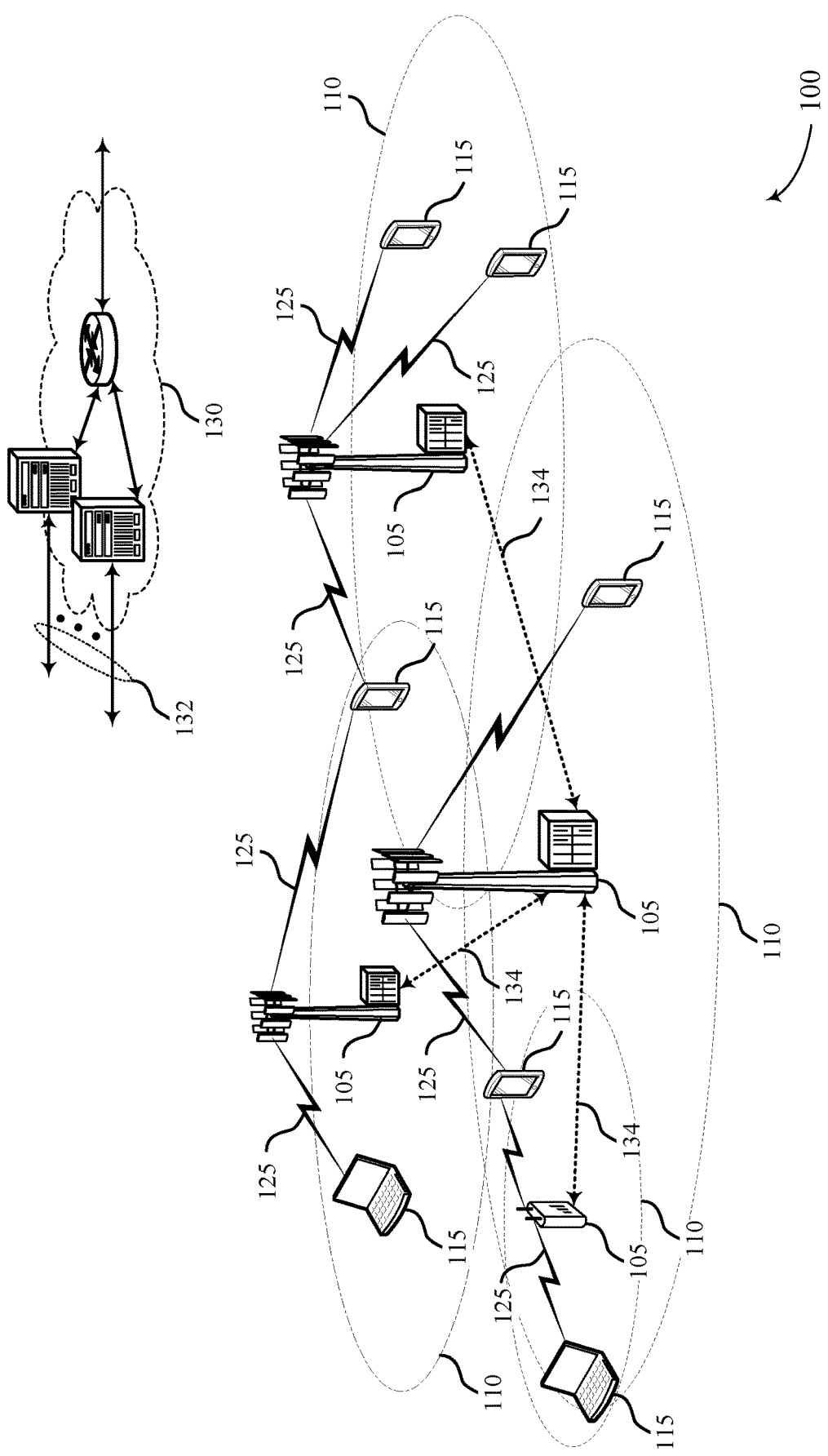
FIG. 1 illustrates an example of a wireless communications system that supports transmission of physical broadcast channel (PBCH) for New Radio (NR) in accordance with aspects of the present disclosure.

In some wireless communications systems (e.g., millimeter wave (mmW) New Radio (NR) systems), wireless devices (e.g., a base station and a user equipment (UE)) may utilize directional or beamformed transmissions (e.g., beams) to communicate with each other. A base station may transmit a physical channel, to allow the base station and a UE to establish communications in a frequency range. For example, the UE and the base station may communicate in a first frequency range (such as sub-6). In some cases, the UE and the base station may communicate in a second frequency range (such as above-6 or mmW) which is higher than the first frequency range. In such cases, the UE may receive broadcast system information from the base station, which the UE may use to access a wireless network (e.g., through the base station). The UE may also receive via a broadcast channel (e.g., physical downlink shared channel (PDSCH)) additional broadcast information (e.g., remaining minimum system information (RMSI) and other system information (OSI)) that may include additional parameters to allow the UE to communicate with the base station.

As part of the communication procedure, the UE may receive a physical broadcast channel (PBCH). In some examples, the PBCH may broadcast a number of parameters that may be utilized by the UE for initial access of the base station. Such parameters may include such System Frame Number (SFN), half-frame indicator, sync signal block (SSB) index indicator, physical resource block (PRB) grid offset, default downlink (DL) numerology, RMSI configuration (or SystemInformationBlock1), front loaded demodulation reference signal (DMRS), cell barring, cell reselection, reserved bits, and cyclic redundancy check (CRC) bits. In cases of sub-6 frequency range, these parameters are carried as a PBCH payload which is 56 bits long. However, in some other frequency ranges (such as above-6 or mmW), one or more fields of the PBCH payload are of a different size. For example, the bits a field of the PBCH payload in a first frequency range may be different from the bits assigned to the field of the PBCH payload in a second frequency range. The present disclosure may support efficient techniques for size matching of the PBCH payload across multiple frequency ranges. More specifically, the present disclosure relates to techniques for size matching of the PBCH payload across sub-6 frequency range and above-6 frequency range.

In NR systems, PBCH is one of the physical channels including information used by a UE to establish communication with a base station. More specifically, the information included in the PBCH may be referred to as the master information block (MIB). In some examples, PBCH is part of an SSB. In some examples, NR systems may include a synchronization raster that designates potential positions where the UE may find a synchronization signal not necessarily coinciding with the center frequency of a given channel. In some examples, the SSB index indicator in the PBCH payload may indicate the beam direction of the corresponding synchronization signal block. The maximum number of possible beam directions for sub-6 systems is 8, while the number of possible beam directions for above-6 systems is 64. In some cases, the synchronization raster may not be aligned with the common PRB grid of the channel and the base station may indicate the frequency offset between the synchronization signal and the common PRB using one of the fields of PBCH. As previously discussed, the PBCH payload in sub-6 systems in 56 bits long. The indication of the beam direction in the transmission of the synchronization signal block out of the 8 possible beam directions in sub-6 systems may be conveyed via the scrambling of the DMRS of PBCH (such as, using 8 different scrambling sequences). In above-6 systems, the beam direction in the transmission of the synchronization signal block out of the possible 64 beam directions may be conveyed by a combination of the PBCH DM-RS scrambling (such as, using 8 different scrambling sequences) and 3 bits may be explicitly transmitted as part of the PBCH payload and may be denoted as SSB index indicator field. Thus, the SSB index indicator field may use the 3 bits to indicate the beam direction in the transmission of the corresponding synchronization signal block in an above-6 system. In sub-6 systems, no bits (i.e., 0 bit) were allocated to the SSB index indicator field. Thus, by allocating 3 bits to the SSB index indicator, a mismatch in the payload of the PBCH is created.

In some examples, to effectively size match the PBCH payload of a sub-6 system with the PBCH payload of an above-6 system, the base station may adjust a quantity of bits associated with a field of the PBCH. In one example, the base station may adjust the bits associated with the reserved field of the PBCH payload. More specifically, in sub-6 systems, the PBCH payload included 5 bits allocated to a reserved field. Such bits are usually included for future use. To size match the PBCH payload in above-6 or mmW systems, the base station may reduce the number of bits in the reserved field from 5 bits to 2 bits. In some examples, the remaining bits in the reserved bit field may be used to trigger a reinterpretation of the PBCH payload in a different field structure In some other examples, to effectively size match the PBCH payload of a sub-6 system with the PBCH payload of an above-6 system, the base station may adjust a quantity of bits associated with the RMSI (or SystemInformationBlock1) config field of the PBCH. For example, the base station may keep the number of bits associated with the reserved field unchanged and may adjust a number of bits associated with the RMSI config field of the PBCH payload. In some example mmW systems, the size matching may be achieved at an expense of slightly coarser indication of RMSI config. In some cases, this RMSI config field is configured to indicate a location of a Control Resource Set (CORESET) of the RMSI message. Thus, a coarser granularity of the RMSI information may still be configured to indicate a location of CORESET for the RMSI scheduling, in time and in frequency.

Another aspect of the present disclosure relates to joint encoding of two fields of the PBCH payload to increase the total amount of information conveyed to the UE, in NR systems. For example, instead of separately encoding two fields in the PBCH payload, the base station may be configured to jointly encode the two fields and convey more information to the UE. In some examples, the default DL numerology field and the PRB grid offset field may be encoded jointly. In some cases, the default DL numerology field may include 1 bit. In some cases, the 1 bit included in the default DL numerology field may be configured to indicate numerology of an RMSI transmission. In some cases, the numerology may indicate a subcarrier spacing (SCS) of the physical channel carrying RMSI in a frequency range. For example, the numerology may indicate the SCS of the physical channel carrying RMSI in a sub-6 frequency range or in an above-6 frequency range. In some examples, an SSB may have one numerology. That is, primary synchronization signals (PSSs), secondary synchronization signals (SSSs) and the PBCH may be configured to have the same numerology. However, the numerology of the RMSI (such as, Physical Downlink Control Channel (PDCCH) and PDSCH) may be different that the numerology of the SSB. Therefore, the default DL numerology may indicate the numerology of the RMSI transmission. In some examples, for sub-6 systems, the SCS for RMSI may be 15 KHz or 30 KHz, and for mmW (or above-6) systems, the SCS may be 60 KHz or 120 KHz.

In some examples, for multiple numerologies, a sub-6 system or an above-6 system may be configured to implement a nesting structure. In some cases, 1 resource block (RB) of a higher numerology may be configured to include 2 RBs or 4 RBs of smaller numerologies. For example, 2 RBs with SCS of 15 KHz may be included in 1 RB with SCS of 30 KHz. Similarly, 4 RBs with SCS of 15 KHz may be included in 2 RBs with SCS of 30 KHz and 1 RB with SCS of 60 KHz.

Additionally or alternatively, the PRB grid offset field in the PBCH payload may include 4 bits. In some cases, the PRB grid offset field may utilize the 4 bits to indicate an offset in a number of subcarriers between the SSB RB grid and a common PRB grid. More specifically, the PRB grid offset may utilize the 4 bits to encode 16 possibilities. In some cases, the common PRB grid may be referred to as a nominal grid for PRBs. In one example system with n RBs allocable in a DL resource allocation, the common PRB grid may range from 0 to n−1. In some examples, a width of the SSB may be equivalent to a predetermined number of PRBs (such as, the width of the SSB may be equivalent to 20 PRBs of the SSB numerology). However, the 20 PRBs of the SSB may not be subcarrier aligned with the underlying common PRB grid used for the transmission of the control (such as, PDCCH) and data channels (such as, PDSCH). This is because, in some cases, the SSB may be configured to be aligned with the synchronization raster. In some cases, a location may not be constant, and as a result, the SSB may not be subcarrier aligned with the underlying common PRB grid. Therefore, in such systems, there can be an offset between the RBs of the common PRB grid and the RBs of the SSB RB grid.

In one example, an indication assuming the same numerology for the SSB and the RMSI (or SystemInformationBlock1) may be configured to convey values 0 through 11 (as the RB size is 12 subcarriers). In some examples, if the default DL numerology field and the PRB grid offset field are jointly encoded, then the system may utilize 5 bits (i.e., 1 bit from the default DL numerology field and 4 bits from the PRB grid offset field) to indicate 32 (i.e., $2^5$) possibilities of the numerology of the RMSI and the offset between the SSB RB grid and the common PRB grid. Thus, the joint encoding of the two fields may more efficiently enable for a mix of numerologies between the SSB and the RMSI.

In some examples, one or more SSBs may not have an RMSI transmission associated with them. In such cases, one of the available bits in the PRB grid offset field or in the jointly encoded default DL numerology and PRB grid offset field may be configured to convey the indication of the associated RMSI transmission for that SSB. For example, the jointly encoded default DL numerology and PRB grid offset field may be configured to convey if there are no associated RMSI transmission for that SSB.

Aspects of the disclosure are initially described in the context of a wireless communications system. Exemplary UEs and base stations (e.g., next generation NodeBs (gNBs), evolved NodeBs (eNBs)), systems, and process flow that support transmission of PBCH for NR. Aspects of the disclosure are further illustrated by and described with reference to apparatus diagrams, system diagrams, and flowcharts that relate to size matching and joint encoding of PBCH in NR.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNB, a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

A base station 105 may perform a connection procedure including a beam sweep procedure to allow the base station 105 and a UE 115 to identify appropriate beams for mmW communications. During the connection procedure, the UE 115 may also receive system information from the base station 105, which the UE 115 may use to access a wireless network (e.g., through the base station 105). The UE 115 may also receive timing information to synchronize with the base station 105. Synchronization (e.g., for cell acquisition) may be performed using synchronization signals or channels transmitted by a synchronization source (e.g., the base station 105). Synchronization signals may include PSSs or SSSs. A UE 115 attempting to access a wireless network may perform an initial cell search by detecting a PSS from the base station 105. In some cases, the base station 105 may provide the other broadcast information for the UE 115 in the PBCH. As such, the PBCH may be used to acquire additional broadcast information needed for acquisition (e.g., radio frame index/number).

In some examples, a base station 105 may be configured to select between a first frequency range and a second frequency range to transmit a physical channel. In some cases, the second frequency range is higher than the first frequency range. In some examples, the base station 105 may jointly encode at least two fields of the physical channel based on the selected frequency range. In some examples, the physical channel may be a PBCH and the two fields may be a default DL numerology field and a PRB grid offset field of the physical channel. In some cases, the base station 105 may jointly encode the fields using 5 bits.

In some examples, the base station 105 may select between a first frequency range and a second frequency range to transmit a physical channel. As previously discussed, the second frequency range may be higher than the first frequency range, and the physical channel may be a PBCH. The base station 105 may then adjust a quantity of bits associated with a field of the physical channel based on the selected frequency range. For example, upon detecting that the PBCH is being transmitted in an above-6 frequency range, the base station 105 may reduce the number of bits in a reserved field of the PBCH. In some examples, the reserved bit field may be used to trigger a reinterpretation of the PBCH payload in a different field structure. In some cases, the base station 105 may not alter the bits in the reserved field and may reduce the number of bits in an RMSI config field of the PBCH.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\,T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
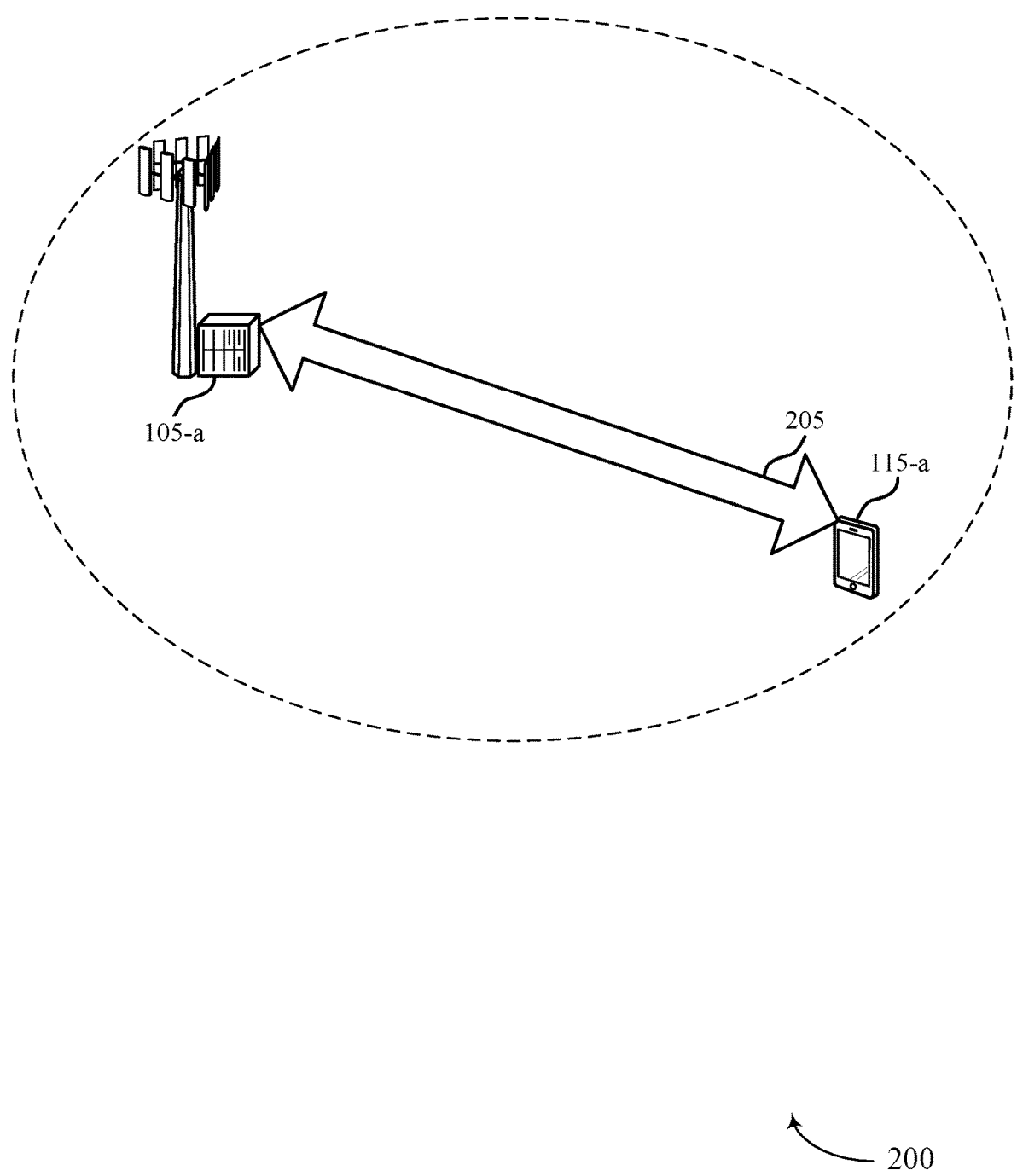
FIG. 2 illustrates an example of a wireless communications system supports transmission of PBCH for NR in accordance with aspects of the present disclosure.

FIG. 2 illustrates an example of a wireless communications system 200 that supports transmission of PBCH for NR in accordance with various aspects of the present disclosure. In some examples, wireless communications system 200 may implement aspects of wireless communications system 100.

In the example of FIG. 2, wireless devices (e.g., UE 115-a) may support communications over carrier 205. According to various techniques described previously, the UE 115-a may utilize directional or beamformed transmissions (e.g., beams) to communicate with each other. The base station 105-a may transmit a physical channel, to allow the base station and a UE to establish communications in a frequency range. For example, the UE 115-a and the base station 105-a may communicate in a first frequency range (such as sub-6). as part of the communication procedure, the UE 115-a may receive a PBCH from the base station 105-a. In some cases, the PBCH may include parameters such as SFN, half-frame indicator, SSB index indicator, PRB grid offset, default DL numerology, RMSI configuration, front loaded DMRS, cell barring, cell reselection, reserved bits, and CRC bits. One or more bits may be allocated to some of these parameters. In cases of sub-6 frequency range, these parameters are carried as a PBCH payload which is, for example, 56 bits long. However, in some other frequency ranges (such as above-6 or mmW), one or more fields of the PBCH payload are of a different size. For example, in above-6 systems, 3 bits may be allocated to the SSB index indicator field. In sub-6 systems, no bits (i.e., 0 bit) were allocated to the SSB index indicator field. Thus, by allocating 3 bits to the SSB index indicator, a mismatch in the payload of the PBCH is created. In some examples, to effectively size match the PBCH payload of a sub-6 system with the PBCH payload of an above-6 system, the base station 105-a, prior to transmitting the PBCH, may adjust a quantity of bits associated with a field of the PBCH. In one example, the base station 105-a may adjust the bits associated with the reserved field of the PBCH payload. For example, to size match the PBCH payload in above-6 or mmW systems, the base station 105-a may reduce the number of bits in the reserved field from 5 bits to 2 bits. In some examples, the remaining bits in the reduced reserved bit field may be used to trigger a reinterpretation of the PBCH payload in a different field structure. As another example, to effectively size match the PBCH payload of a sub-6 system with the PBCH payload of an above-6 system, the base station 105-a may adjust a quantity of bits associated with the RMSI config field of the PBCH. For example, the base station 105-a may keep the number of bits associated with the reserved field unchanged and may adjust a number of bits associated with the RMSI config field of the PBCH payload.

In some examples, one or more SSBs may not have an RMSI transmission associated with them. In such cases, during joint encoding, one of the available bits in the PRB grid offset field or in the jointly encoded default DL numerology and PRB grid offset field may be configured to convey if there are no associated RMSI transmission for that SSB.

In some examples, prior to transmitting the PBCH, the base station 105-a may be configured to jointly encoding two fields of the PBCH payload to increase the total amount of information conveyed to the UE 1150a. For example, instead of separately encoding two fields in the PBCH payload, the base station 105-a may be configured to jointly encode the two fields and convey more information to the UE 115-a. In some examples, the two fields may be default DL numerology field and the PRB grid offset field in the PBCH payload. In some cases, the default DL numerology field may include 1 bit and the PRB grid offset field may include 4 bits. In some cases, the base station 105-a may be configured to jointly encode the default DL numerology field and the PRB grid offset field using 5 bits.

FIGS. 3A and 3B illustrate example size matching of PBCH payloads 300 and 350 that supports transmission of PBCH for NR in accordance with various aspects of the present disclosure. As previously discussed, a base station (such as base station 105 in FIG. 1) may establish a connection with a UE and allocate resources for transmission to the UE. The base station 105 may configure the UE 115 to monitor for CORESETS via downlink transmissions (e.g., downlink mmW beam via bidirectional link 220). In the example of FIG. 3A, the PBCH payload 310 may include one or more fields. As previously discussed, a UE (such as, UE 115) may receive a PBCH as part of a communication procedure. The PBCH may broadcast a number of parameters that may be utilized by the UE for initial access of the base station. The PBCH payload 310 may include SFN, half-frame indicator, SSB index indicator, PRB grid offset, default DL numerology, RMSI configuration, front loaded DMRS, cell barring, cell reselection, reserved bits, and CRC bits. The example of FIG. 3A includes an exemplary bit allocation for each of these fields in sub-6 frequency range as well as in above-6 frequency range. In cases of sub-6 frequency range, the total number of bits 315 in a PBCH payload 310 is 56. More specifically, PBCH payload in 7 bytes, which leads to 7*8=56 bits.

In some examples, the SFN field includes 10 bits in both sub-6 and above-6 frequency ranges, the half-frame indicator field includes 1 bit in both sub-6 and above-6 frequency ranges, the PRB grid offset field includes 4 bits in both sub-6 and above-6 frequency ranges, the default DL numerology field includes 1 bit in both sub-6 and above-6 frequency ranges, the RMSI field includes 8 bits in both sub-6 and above-6 frequency ranges, the front loaded DMRS field includes 1 bit in both sub-6 and above-6 frequency ranges, the cell barring field includes 1 bit in both sub-6 and above-6 frequency ranges, the cell reselection field includes 1 bit in both sub-6 and above-6 frequency ranges, and the CRC field includes 24 bits in in both sub-6 and above-6 frequency ranges. In some frequency ranges (such as above-6 or mmW), one or more fields of the PBCH payload may be of a different size. For example, the bits the SSB index field 325 of the PBCH payload in sub-6 frequency range may be different from the bits assigned to the SSB index field 325 of the PBCH payload in the above-6 frequency range. The SSB index field 325 is non-existent in systems employing sub-6 frequency range because there are 8 beams in sub-6 systems and the beams may be indicated by DMRS scrambling code. However, in above-6 systems, there are 64 beams. As a result, 3 bits may be provided by the SSB index field 325 to indicate, in conjunction with the 8 DMRS scrambling codes, a total of 64 beams. More specifically, the SSB index field may have 0 bit assigned in the sub-6 frequency range. However, the SSB index field may have 3 bits assigned in the above-6 frequency range. This may lead to a mismatch and thus there may be a need to efficiently size match the PBCH payloads 310 across multiple frequency ranges.

Additionally or alternatively, as previously discussed, NR systems may include a synchronization raster that designates potential positions where a UE may find a synchronization signal block. Base station operating in above-6 frequency ranges may utilize the SSB index field 325 in the PBCH payload 310 to indicate, in conjunction with the 8 DMRS scrambling codes, the beam of the corresponding SSB transmission. In some examples, to effectively size match the PBCH payload 310 of a sub-6 system with the PBCH payload 310 of an above-6 system, the base station may adjust a quantity of bits associated with the reserved field 320 of the PBCH. More specifically, to keep the total number of bits 315 constant for sub-6 systems and above-6 systems, the base station may determine a number of bits for the reserved field of the above-6 system by subtracting a summation of bits from all other fields from the total number of bits 315. For example, in sub-6 systems, the PBCH payload included 5 bits allocated to a reserved field 320, and to size match the PBCH payload 310 in above-6 or mmW systems, the base station may reduce the number of bits in the reserved field 320 from 5 bits to 2 bits. In some examples, the bits in the reserved bit field may be used to trigger a reinterpretation of the PBCH payload in a different field structure. In this way, the total number of bits 315 may remain constant for systems using sub-6 frequency range as well as for systems using above-6 frequency range.

In the example of FIG. 3B, the PBCH payload 355 may include SFN, half-frame indicator, SSB index indicator, PRB grid offset, default DL numerology, RMSI configuration, front loaded DMRS, cell barring, cell reselection, reserved bits, and CRC bits. FIG. 3B further includes the bit allocation for each of these fields in sub-6 frequency range as well as in above-6 frequency range. In cases of sub-6 frequency range, the total number of bits 3 in a PBCH payload 355 is 56.

In the example of FIG. 3B, the SFN field includes 10 bits in both sub-6 and above-6 frequency ranges, the half-frame indicator field includes 1 bit in both sub-6 and above-6 frequency ranges, the PRB grid offset field includes 4 bits in both sub-6 and above-6 frequency ranges, the default DL numerology field includes 1 bit in both sub-6 and above-6 frequency ranges, the front loaded DMRS field includes 1 bit in both sub-6 and above-6 frequency ranges, the cell barring field includes 1 bit in both sub-6 and above-6 frequency ranges, the cell reselection field includes 1 bit in both sub-6 and above-6 frequency ranges, the reserved field includes 5 bits in both sub-6 and above-6 frequency ranges, and the CRC field includes 24 bits in in both sub-6 and above-6 frequency ranges. As previously discussed, in systems employing above-6 frequency range, one or more fields of the PBCH payload may be of a different size. For example, the bits the SSB index field 360 of the PBCH payload 355 in sub-6 frequency range may be different from the bits assigned to the SSB index field 360 of the PBCH payload 355 in the above-6 frequency range. More specifically, the SSB index field 360 may have 0 bit assigned in the sub-6 frequency range. However, the SSB index field 360 may have 3 bits assigned in the above-6 frequency range. In the example of FIG. 3B, to effectively size match the PBCH payload 355 of a sub-6 system with the PBCH payload 355 of an above-6 system, the base station may adjust a quantity of bits associated with the RMSI config field 365 of the PBCH payload 355. In some cases, the base station (such as base station 105) may keep the number of bits associated with the reserved field unchanged and may adjust a number of bits associated with the RMSI config field 365 of the PBCH payload 355. In some cases, the adjustment of the RMSI config field 365 may lead to a coarser indication of a location of a CORESET of the RMSI message.

Figure 4A:
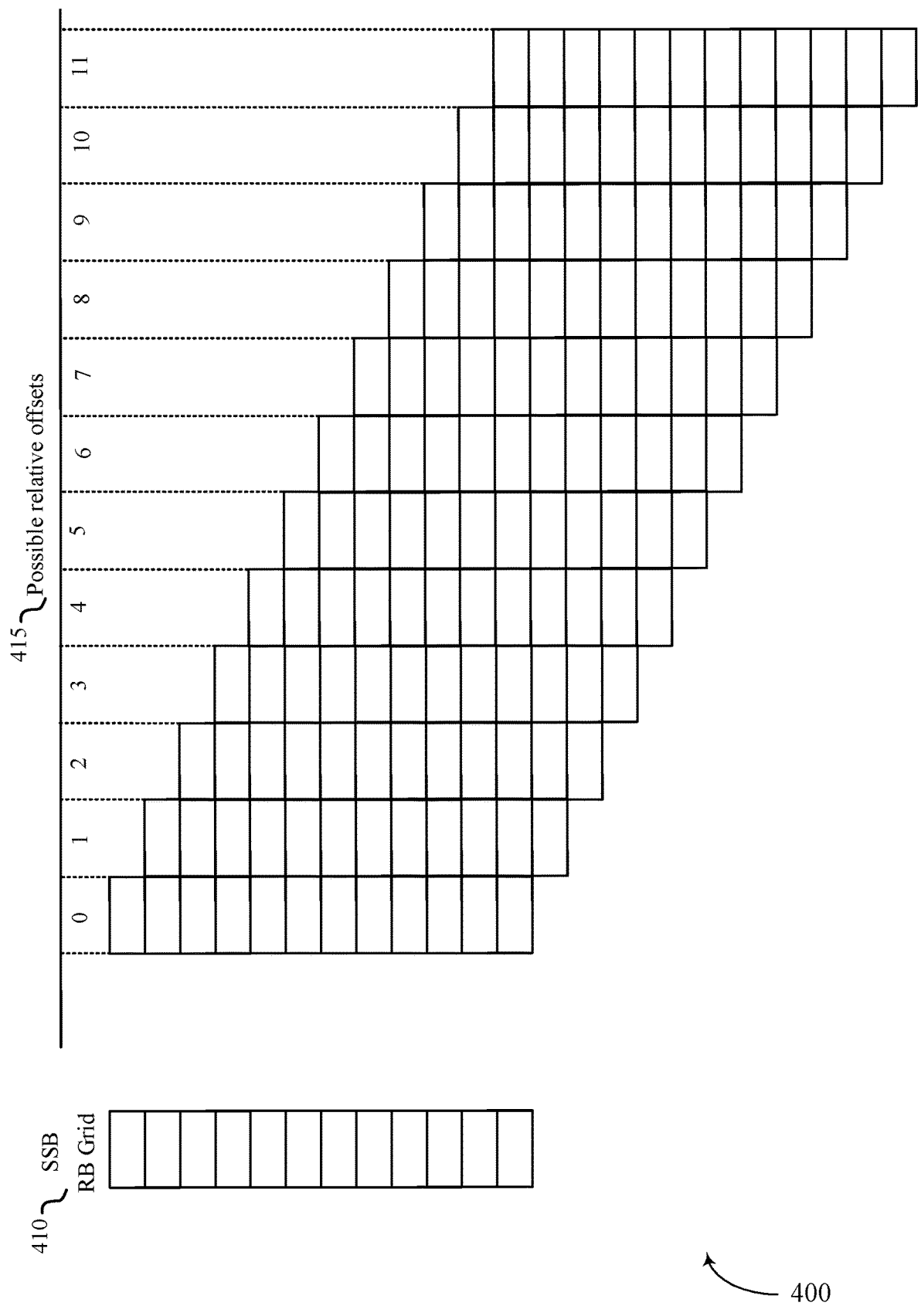
FIGS. 4A-4B illustrate examples of offset possibilities that supports transmission of PBCH for NR in accordance with aspects of the present disclosure.

FIG. 4A illustrates an example of offset possibilities 400 that supports transmission of PBCH for NR in accordance with various aspects of the present disclosure. In some examples, the offset possibilities 400 may describe possible offset options when an SSB SCS is equal to an RMSI SCS In the example of FIG. 4A, possible options are discussed for an offset between an SSB RB grid and a common PRB grid when the numerology (or SCS) of the SSB RB is equal to the numerology of the RMSI. As previously discussed, a default DL numerology field in the PBCH payload may include 1 bit. In some cases, the bit included in the default DL numerology field may be configured to indicate a numerology indicating an SCS of an RMSI transmission. In some examples, the numerology of an SSB may determine the numerology of the PSSs, the SSSs and the PBCH. In the example of FIG. 4A, the numerology of the SSB is equal to the numerology of the RMSI. In this case, the default DL numerology may indicate the numerology of the RMSI transmission which is same as the numerology of the SSB.

In some examples, the PRB grid offset field in a PBCH payload may include 4 bits. The PRB grid offset field may utilize the 4 bits to indicate an offset in a number of subcarriers between the SSB RB grid and a common PRB grid. The common PRB grid may be referred to as a nominal grid for PRBs which may range from 0 to n−1 for a system with n allocable RBs. In some examples, a width of the SSB may be equivalent to a predetermined number of PRBs. However, the RBs of the SSB may not be subcarrier aligned with the underlying common PRB grid. This may be referred to as an offset between the SSB RB grid and the common PRB grid. In the example of FIG. 4A, the SSB RB grid 410 may include 12 possible relative offsets 415 between the common PRB grid and the SSB RB grid, from 0 to 11 subcarriers.

Figure 4B:
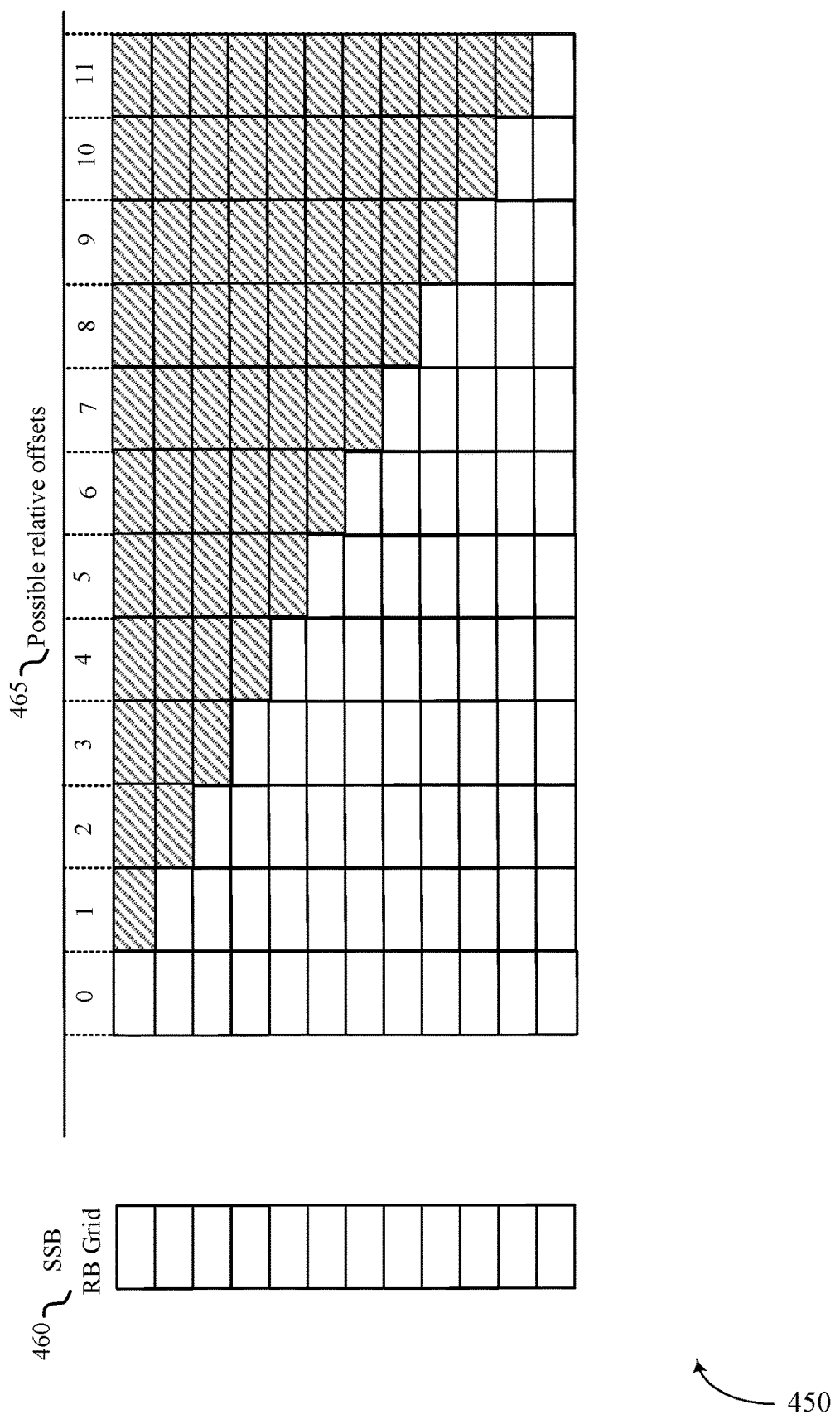

FIG. 4B illustrates an example of offset possibilities 450 that supports transmission of PBCH for NR in accordance with various aspects of the present disclosure. In some examples, the offset possibilities 450 may describe possible offset options when an SSB SCS is equal to an RMSI SCS. In one example, the offset possibilities 450 described with reference to FIG. 4B may be an alternative option to the offset possibilities 400 described with reference to FIG. 4A.

Figure 12:
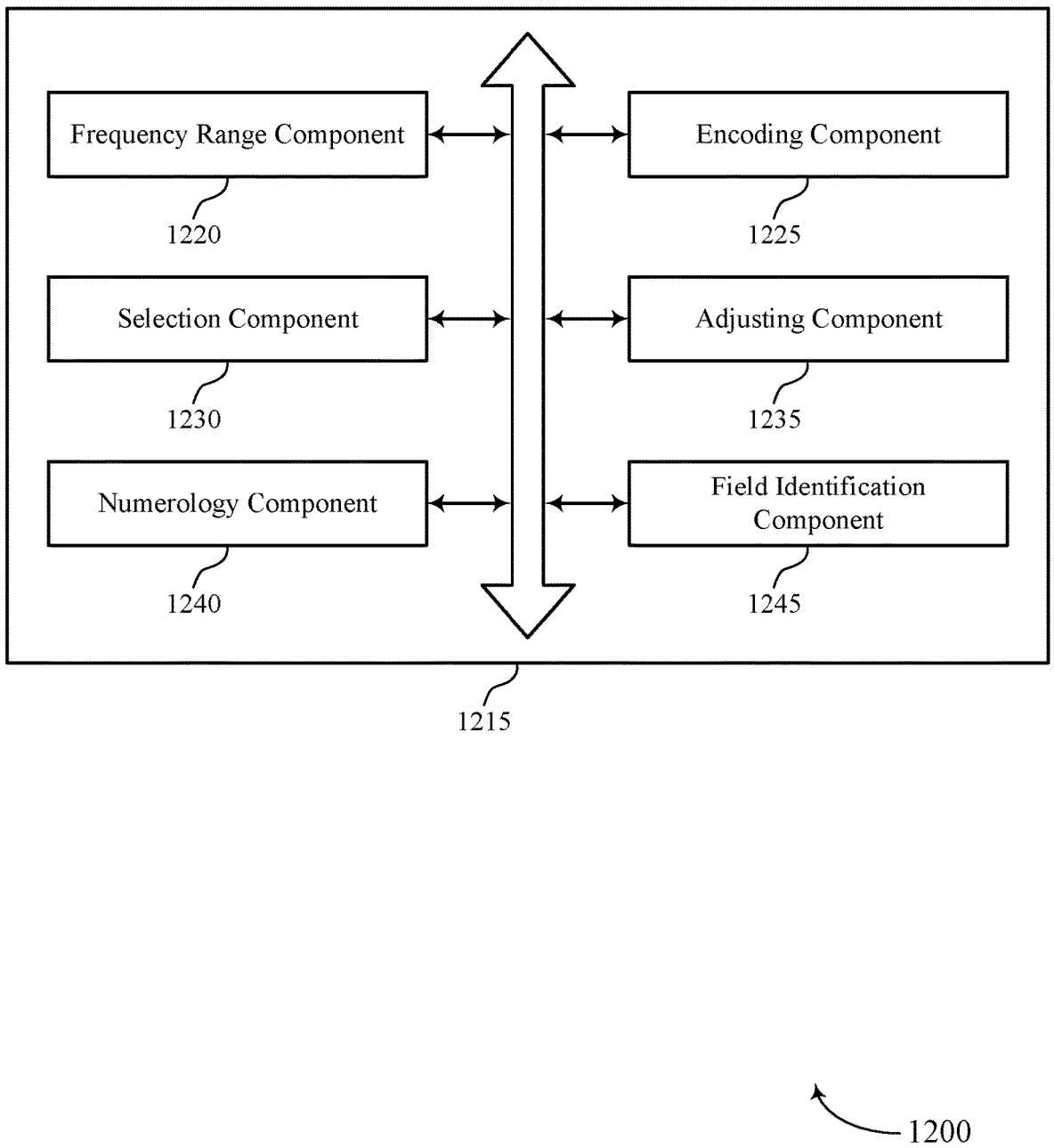

In the example of FIG. 4B, 12 possible offset options are discussed for an offset between an SSB RB grid and a common PRB grid when the numerology (or SCS) of the SSB RB is equal to the numerology of the RMSI. In some examples, a default DL numerology field in the PBCH payload may include 1 bit and a PRB grid offset field in the PBCH payload may include 4 bits. In some cases, the bit included in the default DL numerology field may be configured to indicate a numerology indicating an SCS of an RMSI transmission. In some examples, the numerology of an SSB may determine the numerology (or SCS) of the PSSs, the SSSs, and the PBCH. In the example of FIG. 4B, the numerology of the SSB is equal to the numerology of the RMSI. In this case, the bit included in the default DL numerology field may be configured to indicate the numerology of the RMSI transmission, which is same as the numerology of the SSB.

In some examples, the 4 bits included in the PRB grid offset field may be configured to indicate an offset in a number of subcarriers between the SSB RB grid and a common PRB grid. As previously discussed, the common PRB grid may be referred to as a nominal grid for PRBs which may range from 0 to n−1 for a system with n allocable RBs. In this example, a width of the SSB may be equivalent to a predetermined number of PRBs, and the RBs of the SSB may not be subcarrier aligned with the underlying common PRB grid. FIG. 4B describes offset possibilities when the RBs of the SSB is not subcarrier aligned with the underlying common PRB grid. More specifically, the SSB RB grid 460 may include 12 possible relative offsets 465 between the common PRB grid and the SSB RB grid, from 0 to 11 subcarriers. As an example, SSB RB grid 460 may include 12 RBs and the RBs may be aligned with the common PRB grid using 12 different offset possibilities.

Figure 5A:
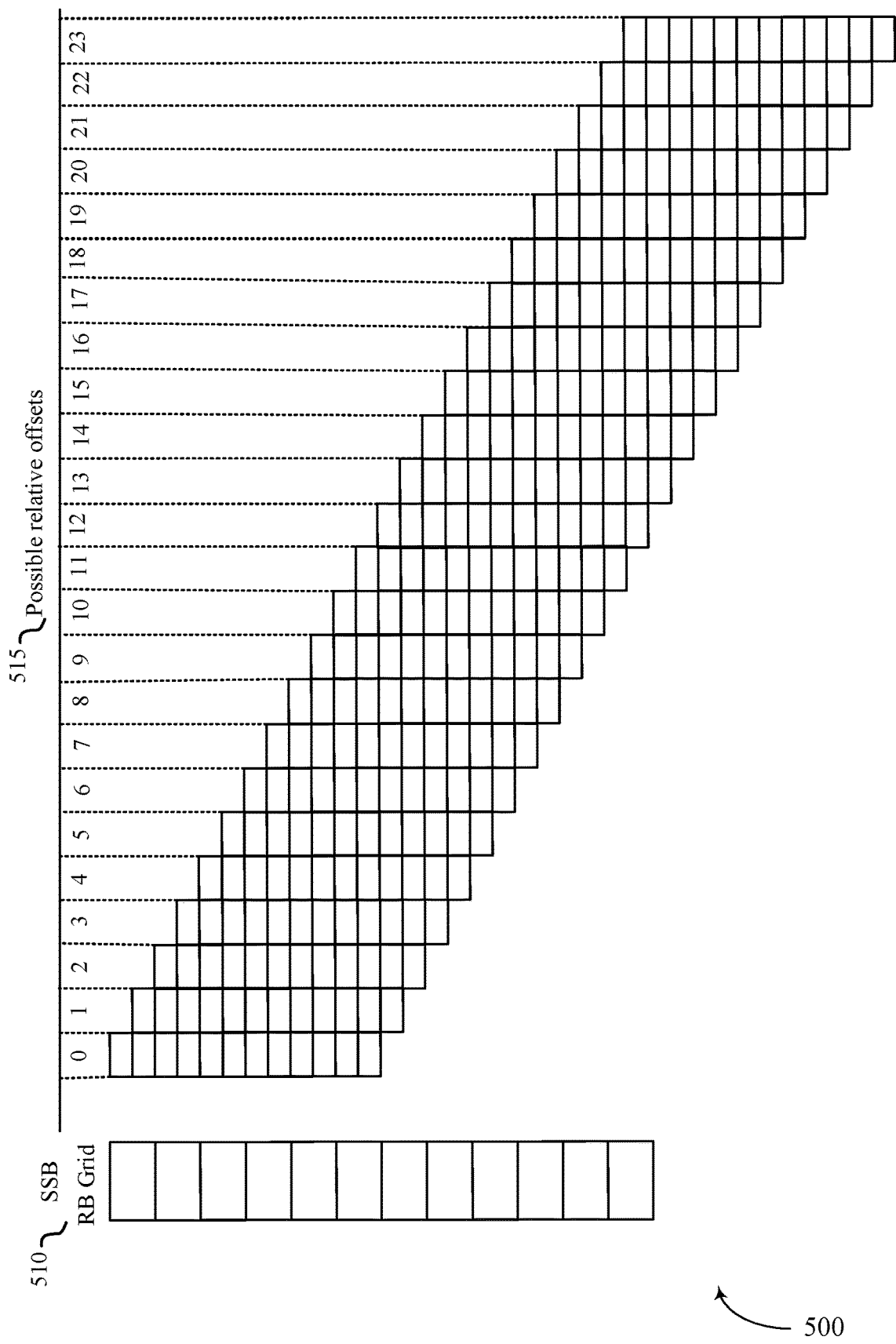
FIGS. 5A-5C illustrate examples of offset possibilities that supports transmission of PBCH for NR in accordance with aspects of the present disclosure.

FIG. 5A illustrates an example of offset possibilities 500 that supports transmission of PBCH for NR in accordance with various aspects of the present disclosure. In some examples, the offset possibilities 500 may describe possible offset options when an SSB SCS is greater than an RMSI SCS.

In the example of FIG. 5A, possible options 515 are discussed for an offset between an SSB RB grid 510 and a common PRB grid when the numerology (or SCS) of the SSB RB is twice than the numerology of the RMSI. As previously discussed with reference to FIG. 4A, a default DL numerology field in the PBCH payload may include 1 bit which may be configured to indicate a numerology or an SCS of an RMSI transmission. In some examples, the numerology of an SSB may determine the numerology of the PSSs, the SSSs and the PBCH, and a numerology of the RMSI may indicate the numerology of PDCCH and PDSCH. In the example of FIG. 5A, the numerology of the SSB is twice the numerology of the RMSI. For example, in some sub-6 systems, the SCS may be 15 KHz or 30 KHz, and in some mmW (or above-6) systems, the SCS may be 60 KHz or 120 KHz. In the example of FIG. 5A, for multiple numerologies, the system is configured to implement a nesting structure. More specifically, 1 RB of a higher numerology may be configured to include 2 RBs or 4 RBs of smaller numerologies.

As previously discussed, the PRB grid offset field in a PBCH payload may include 4 bits which may indicate an offset between the SSB RB grid 510 and a common PRB grid. In the example of FIG. 5, there may be 24 possible relative offsets 515 between the SSB RB grid 510 and the common PRB grid assuming, by way of an example, that the SSB SCS is twice that of RMSI. This is because, after the 24th possibility, the next offset will be equivalent to the 0th possibility.

Figure 5B:
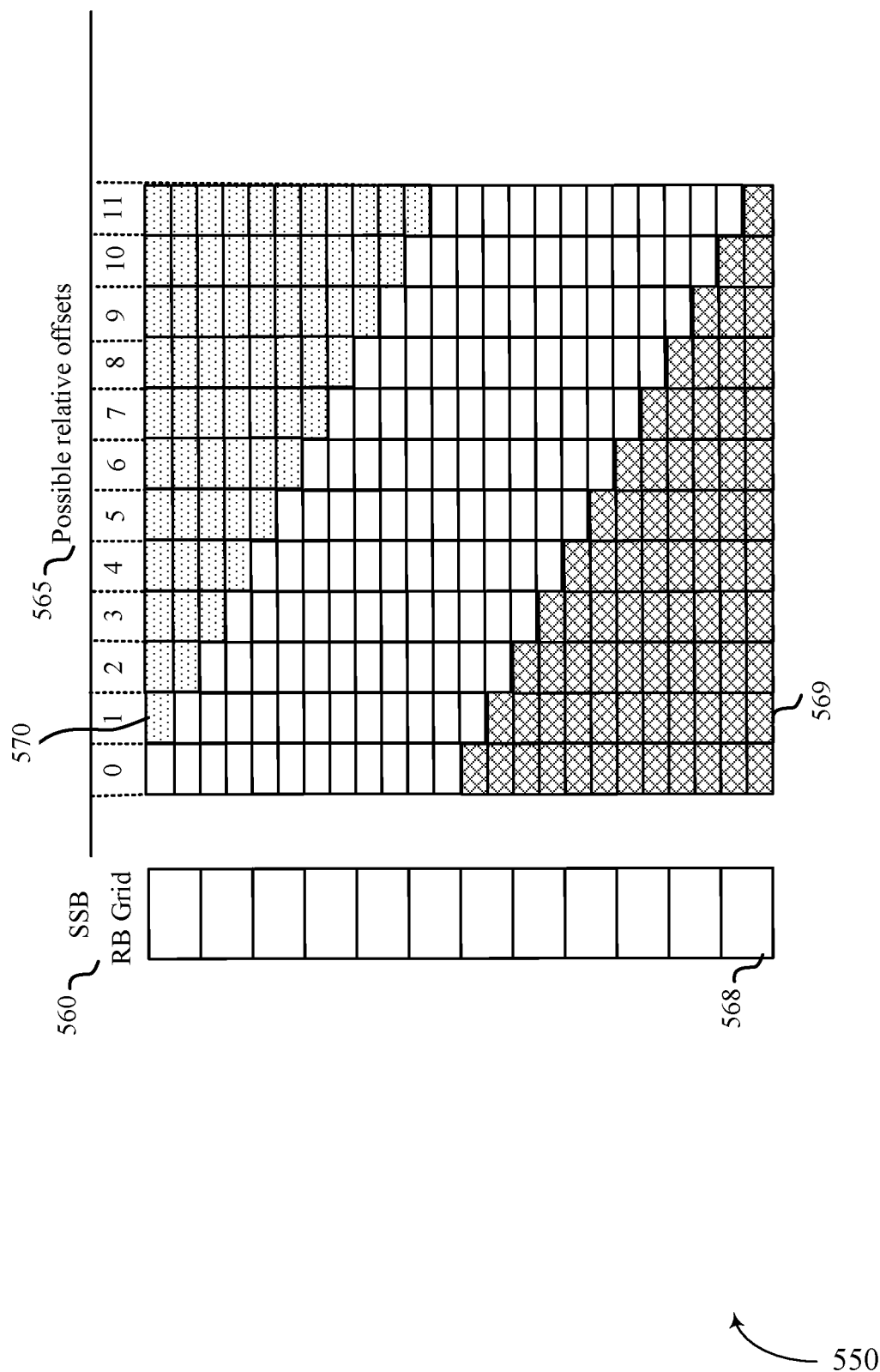

FIG. 5B illustrates an example of offset possibilities 550 that supports transmission of PBCH for NR in accordance with various aspects of the present disclosure. In some examples, the offset possibilities 550 may describe possible offset options when an SSB SCS is greater than an RMSI SCS. More specifically, the offset possibilities 550 may describe possible offset options when the SSB SCS is twice the RMSI SCS. In one example, the offset possibilities 550 described with reference to FIG. 5B may be an alternative option to the offset possibilities 500 described with reference to FIG. 5A.

As previously discussed with reference to FIGS. 4A and 4B, a default DL numerology field in the PBCH payload may include 1 bit which may be configured to indicate a numerology or an SCS of an RMSI transmission. In some examples, the numerology of an SSB may determine the numerology of the PSSs, the SSSs and the PBCH, and a numerology of the RMSI may indicate the numerology of PDCCH and PDSCH. In some examples, when the numerology of the SSB is twice the numerology of the RMSI, a system may be configured to implement a nesting structure. For example, in some sub-6 systems, the SCS may be 15 KHz or 30 KHz, and in some mmW (or above-6) systems, the SCS may be 60 KHz or 120 KHz. In the example of FIG. 5B, 1 RB of a higher numerology may be configured to include 2 RBs of smaller numerologies.

As previously discussed, the PRB grid offset field in a PBCH payload may include 4 bits which may indicate an offset between the SSB RB grid 560 and a common PRB grid. In some examples, in order to associate the SSB SCS (or numerology) with the SCS of the common PRB grid, a nesting structure may be implemented. In the example of FIG. 5B, there may be 12 possible relative offsets 565 between the SSB RB grid 560 and the common PRB grid assuming, by way of an example, that the SSB SCS is twice the SCS of the RMSI. In this example, 1 RB associated with the SSB is equivalent to 2 RBs associated with the common PRB grid. A first offset possibility may include no offset, a second possibility may include an offset by 1 RB, a third possibility may include an offset by 2 RBs, and so on. In one example, when the offset is by 1 RB, 11 RBs associated with the SSB may be aligned with the common PRB grid, and a remaining RB may be aligned with 2 remaining non-adjacent RBs in the common PRB grid. In the example of FIG. 5B, for instance 1, 11 RBs associated with the SSB is aligned with the common PRB grid, and a remaining RB 568 may be aligned with a remaining RB 569 in the common PRB grid along with a non-adjacent RB 570 in the common PRB grid.

Figure 5C:
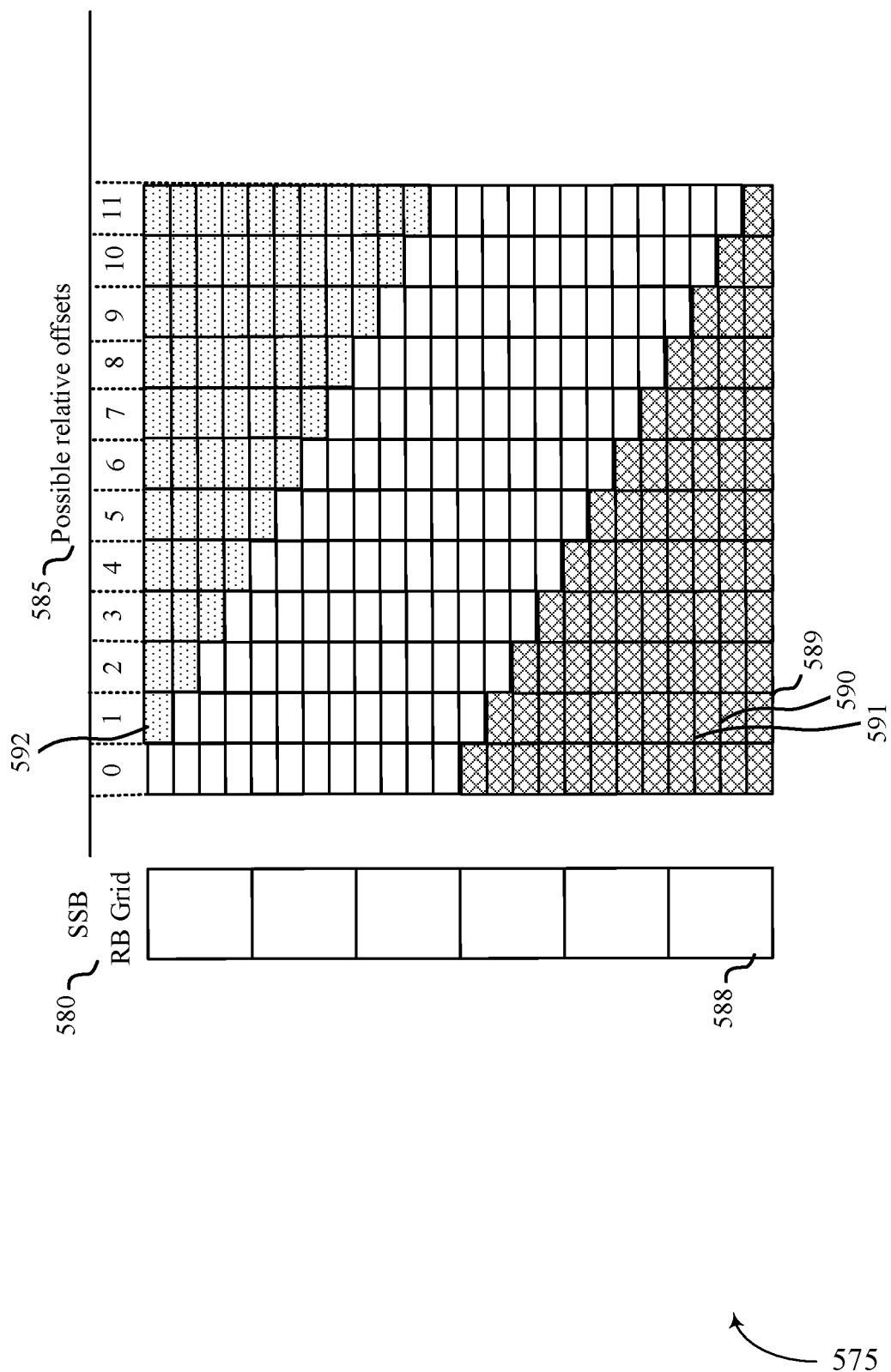

FIG. 5C illustrates an example of offset possibilities 575 that supports transmission of PBCH for NR in accordance with various aspects of the present disclosure. In some examples, the offset possibilities 575 may describe possible offset options when an SSB SCS is greater than an RMSI SCS. More specifically, the offset possibilities 575 may describe possible offset options when the SSB SCS is four times the RMSI SCS.

As previously discussed with reference to FIGS. 4A, 4B, 5A and 5B, a default DL numerology field in the PBCH payload may include 1 bit which may be configured to indicate a numerology or an SCS of an RMSI transmission, and a numerology of an SSB may determine the numerology of the PSSs, the SSSs and the PBCH. Further, a numerology of the RMSI may indicate the numerology of PDCCH and PDSCH. In some examples, when the numerology of the SSB is four times the numerology of the RMSI, a system may be configured to implement a nesting structure. As previously discussed, in some sub-6 systems, the SCS may be 15 KHz or 30 KHz, and in some mmW (or above-6) systems, the SCS may be 60 KHz or 120 KHz. In the example of FIG. 5C, 1 RB of a higher numerology may be configured to include 4 RBs of smaller numerologies.

In some examples, the PRB grid offset field in a PBCH payload may include 4 bits which may indicate an offset between the SSB RB grid 580 and a common PRB grid. In the example of FIG. 5C, there may be 12 possible relative offsets 585 between the SSB RB grid 580 and the common PRB grid assuming, by way of an example, that the SSB SCS is four times the SCS of the RMSI. In this example, 1 RB associated with the SSB is equivalent to 4 RBs associated with the common PRB grid. In the example of FIG. 5C, a first offset possibility may include no offset between the SSB SCS and the SCS of the RMSI, a second possibility may include an offset by 1 RB, a third possibility may include an offset by 2 RBs, and so on. In one example, when the offset is by 1 RB, 5 RBs associated with the SSB may be aligned with the common PRB grid, and a remaining RB may be aligned with 4 remaining non-adjacent RBs in the common PRB grid. In the example of FIG. 5C, for instance 1, 5 RBs associated with the SSB is aligned with the common PRB grid, and a remaining RB 588 may be aligned with a first remaining RB 589, a second remaining RB 590 adjacent to the first remaining RB 589, and a third remaining RB 591 adjacent to the second remaining RB 590 in the common PRB grid, along with a non-adjacent RB 592 in the common PRB grid.

Figure 6A:
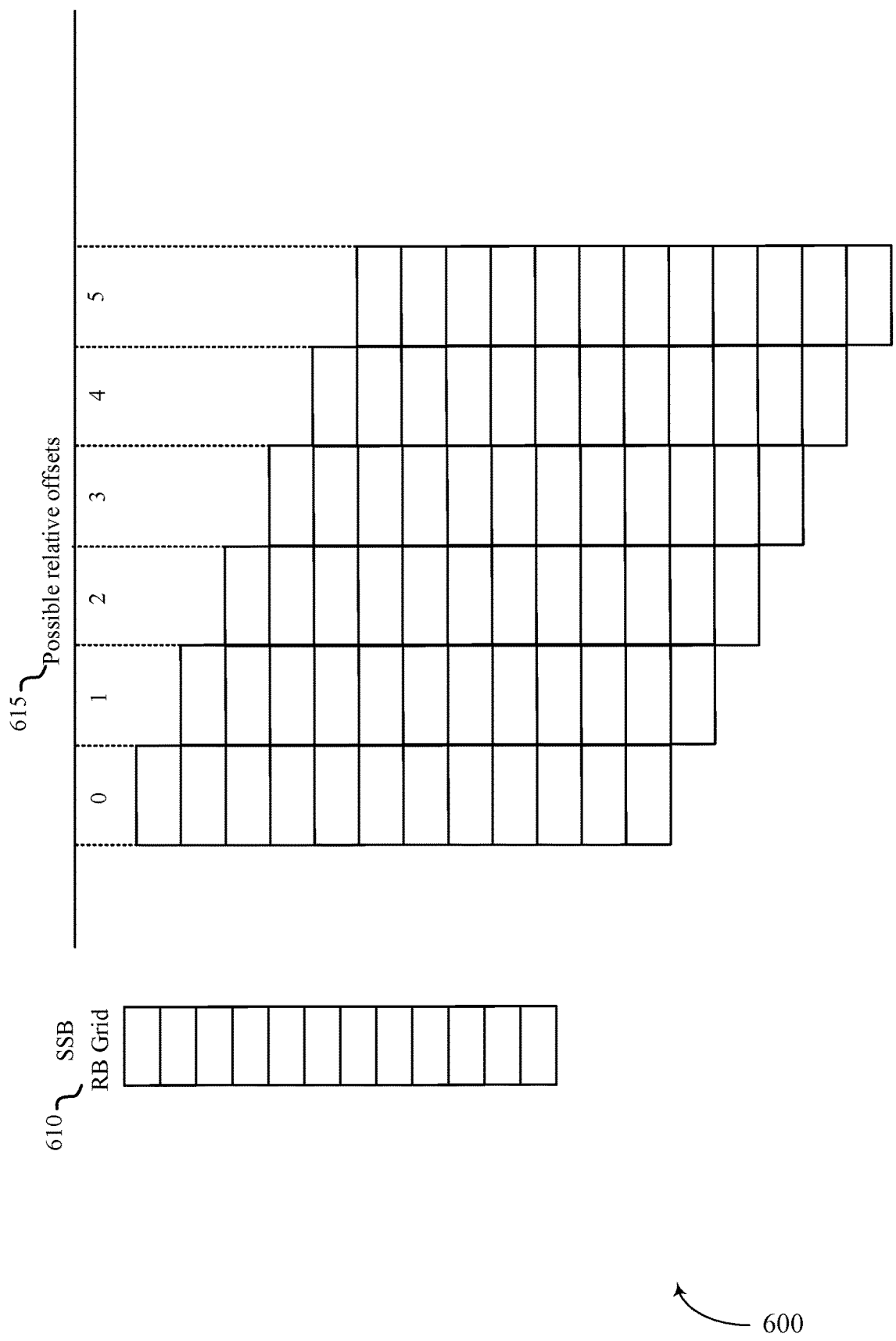
FIGS. 6A-6B illustrate examples of offset possibilities that supports transmission of PBCH for NR in accordance with aspects of the present disclosure.

FIG. 6A illustrates an example of offset possibilities 600 that supports transmission of PBCH for NR in accordance with various aspects of the present disclosure. In some examples, the offset possibilities 600 may describe possible offset options when an SSB SCS is less than an RMSI SCS.

In the example of FIG. 6A, possible options are discussed for an offset between an SSB RB grid 610 and a common PRB grid when the SCS of the SSB RB is half of the SCS of the RMSI. As previously discussed with reference to FIGS. 4A, 4B, 5A, 5B, and 5C, a default DL numerology field in the PBCH payload may include 1 bit which may be configured to indicate a numerology or an SCS of an RMSI transmission. In some examples, the numerology of an SSB may determine the numerology of the PSSs, the SSSs and the PBCH, and a numerology of the RMSI may indicate the numerology of PDCCH and PDSCH. In the example of FIG. 6A, the numerology of the SSB is half of the numerology of the RMSI. In some sub-6 systems, the SCS of the SSB may be 15 KHz and the SSB of the RMSI may be 30 KHz. Similarly, in some mmW (or above-6) systems, the SCS of the SSB may be 60 KHz and the SCS of the RMSI may be 120 KHz. In the example of FIG. 6A, for multiple numerologies, the system is configured to implement a nesting structure. More specifically, 1 RB of a higher numerology may be configured to include 2 RBs or 4 RBs of smaller numerologies. In the example of FIG. 6A, there may be 6 possible relative offsets 615 between the SSB RB grid 610 and the common PRB grid assuming, by way of an example, that the SSB SCS is half of that of RMSI. In this case, 2 RBs of the SSB may span the equivalent to 1 RB of the RMSI.

Figure 6B:
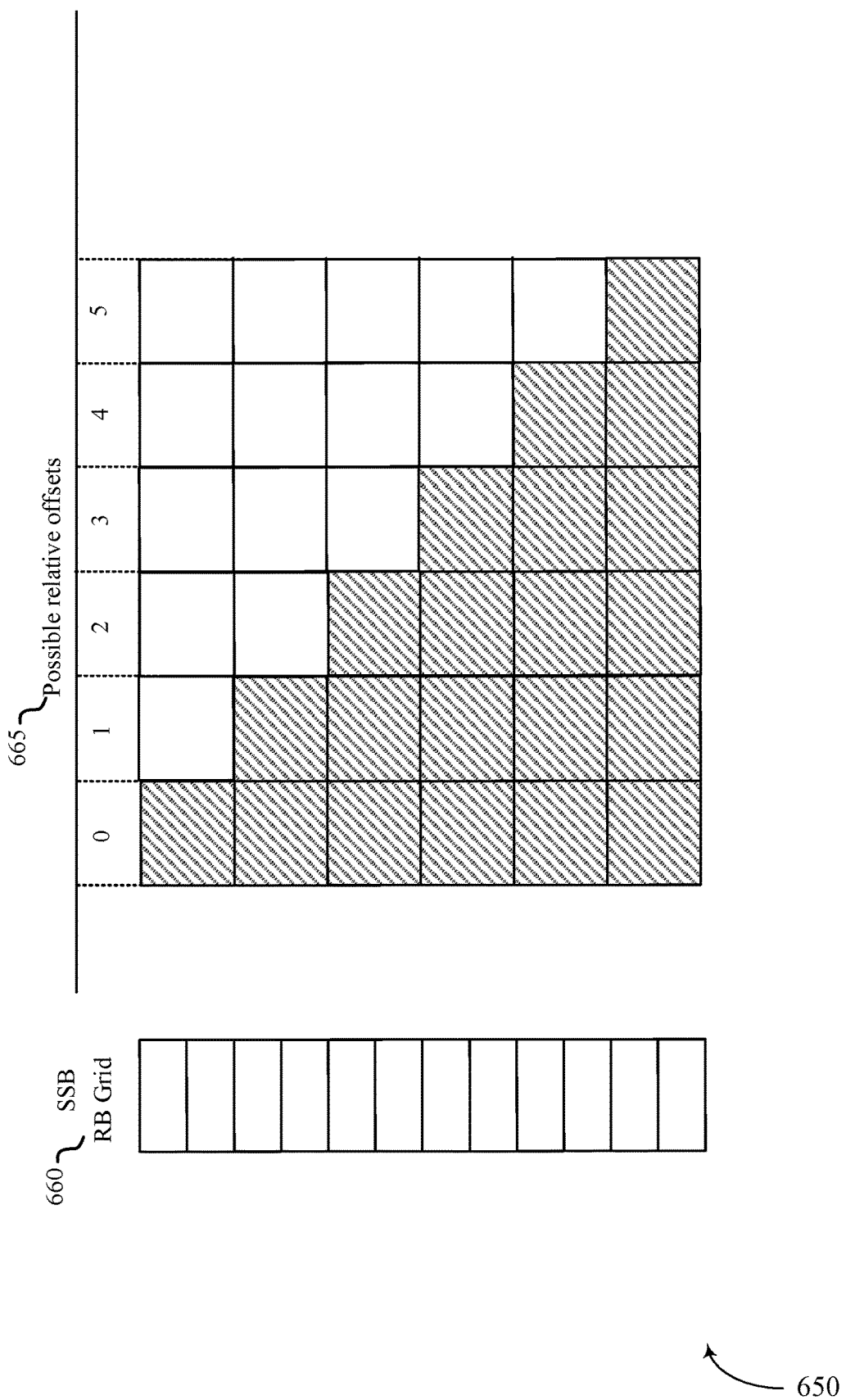

FIG. 6B illustrates an example of offset possibilities 650 that supports transmission of PBCH for NR in accordance with various aspects of the present disclosure. In some examples, the offset possibilities 650 may describe possible offset options when an SSB SCS is less than an RMSI SCS. In one example, the offset possibilities 650 described with reference to FIG. 6B may be an alternative option to the offset possibilities 600 described with reference to FIG. 6A.

In the example of FIG. 6B, possible options are discussed for an offset between an SSB RB grid 660 and a common PRB grid when the SCS of the SSB RB is half of the SCS of the RMSI. As previously discussed, a default DL numerology field in the PBCH payload may include 1 bit which may be configured to indicate a numerology or an SCS of an RMSI transmission. In the example of FIG. 6B, the numerology of the SSB is half of the numerology of the RMSI. In this example, 1 RB of a higher numerology (such as, an RB of the common PRB grid) may be configured to include 2 RBs of smaller numerologies (such as, RBs of the SSB RB grid 660). In the example of FIG. 6B, there may be 6 possible relative offsets 665 between the SSB RB grid 660 and the common PRB grid assuming, by way of an example, that the SSB SCS is half of that of RMSI.

Figure 7A:
FIGS. 7A-7B illustrate examples of tables that support transmission of PBCH for NR in accordance with aspects of the present disclosure.

FIG. 7A illustrates an example of a table 700 that supports transmission of PBCH for NR in accordance with various aspects of the present disclosure. In some examples, the table 700 may describe an exhaustive number of options conditioned to the numerology (or SCS) of SSB. The table 700 described with reference to FIG. 7A may include the offset possibilities as described with reference FIGS. 4A, 5A and 6A.

In the example of FIG. 7A, a number of possible combinations of SSB SCS and RMSI SCS are discussed. The left column describes the frequency range of the system associated with the SSB and RMSI. In one example. the frequency range may be sub-6 and in another example, the frequency range may be above-6. For sub-6 systems, there are 4 possible combinations of offset option of SSB SCS and RMSI SCS. The first combination is SSB SCS being 30 KHz and the RMSI SCS being 30 KHz. The number of offset options in such a case will be 12. The number of offsets may be determined using methods described with reference to FIG. 4A. The second combination is SSB SCS being 30 KHz and the RMSI SCS being 15 KHz. The number of offset options in such a case will be 24. The number of offsets may be determined using methods described with reference to FIG. 5A. The third combination is SSB SCS being 15 KHz and the RMSI SCS being 30 KHz. The number of offset options in such a case may be 6. The number of offsets may be determined using methods described with reference to FIG. 6A. The fourth combination is SSB SCS being 15 KHz and the RMSI SCS being 15 KHz. The number of offset options in such a case will be 12. The number of offsets may be determined using methods described with reference to FIG. 4A.

Similarly, for above-6 systems, there are 4 possible combinations of SSB SCS and RMSI SCS. The first combination is SSB SCS being 240 KHz and the RMSI SCS being 120 KHz. The number of offset options in such a case will be 24. The number of offsets may be determined using methods described with reference to FIG. 5A. The second combination is SSB SCS being 240 KHz and the RMSI SCS being 60 KHz. The number of offset options in such a case will be 0. In some cases, the number of offset options being 0 may indicate that it is unlikely that the SSB SCS will be 4 times the RMSI SCS. Thus, it is assumed that the RMSI cannot be 60 KHz SCS. The third combination is SSB SCS being 120 KHz and the RMSI SCS being 120 KHz. The number of offset options in such a case will be 12. The number of offsets may be determined using methods described with reference to FIG. 4A. The fourth combination is SSB SCS being 120 KHz and the RMSI SCS being 60 KHz. The number of offset options in such a case will be 24. The number of offsets may be determined using methods described with reference to FIG. 5A.

In such cases, the base station may be configured to jointly encode the default DL numerology field and the PRB grid offset field using 5 bits. Thus, using 5 bits, 32 possibilities may be addressed. As described with reference to FIG. 7A, there are a total of 36 maximum offset possibilities when SSB SCS is 30 KHz in sub-6 systems and when SSB SCS is 120 KHz in above-6 systems. In contrast, if the fields are encoded separately (PRB grid offset using 4 bits and default DL numerology using 1 bit), then there will be 8 possibilities that cannot be encoded. Thus, by jointly encoding 2 fields using 5 bits, more information may be conveyed than by separately encoding each field.

Figure 7B:

FIG. 7B illustrates an example of a table 750 that supports transmission of PBCH for NR in accordance with various aspects of the present disclosure. In some examples, the table 750 may describe an exhaustive number of options conditioned to the numerology (or SCS) of SSB. The table 750 described with reference to FIG. 7B may include the alternative offset possibilities as described with reference FIGS. 4B, 5B, 5C, and 6B.

In the example of FIG. 7B, a number of possible combinations conditioned to SSB SCS and RMSI SCS are discussed. The left column describes the frequency range of the system associated with the SSB and RMSI. In one example. the frequency range may be sub-6 and in another example, the frequency range may be above-6. For sub-6 systems, there may be 4 possible combinations of offset option of SSB SCS and RMSI SCS. In the example of FIG. 7B, the first combination is SSB SCS equal to 30 KHz and the RMSI SCS equal to 30 KHz. The number of offset options in such a case may be 12. The number of offsets may be determined using methods described with reference to FIG. 4B. The second combination in this example is SSB SCS being 30 KHz and the RMSI SCS being 15 KHz. The number of offset options in such a case will be 12. The number of offsets may be determined using methods described with reference to FIG. 5B. The third combination is SSB SCS being 15 KHz and the RMSI SCS being 30 KHz. The number of offset options in such a case will be 6. The number of offsets may be determined using methods described with reference to FIG. 6B. The fourth combination is SSB SCS being 15 KHz and the RMSI SCS being 15 KHz. The number of offset options in such a case will be 12. The number of offsets may be determined using methods described with reference to FIG. 4B.

Similarly, for above-6 systems, there are 4 possible combinations of SSB SCS and RMSI SCS. The first combination is SSB SCS being 240 KHz and the RMSI SCS being 120 KHz. The number of offset options in such a case will be 12. The number of offsets may be determined using methods described with reference to FIG. 5B. The second combination is SSB SCS being 240 KHz and the RMSI SCS being 60 KHz. The number of offset options in such a case will be 12. The number of offsets may be determined using methods described with reference to FIG. 5C. The third combination is SSB SCS being 120 KHz and the RMSI SCS being 120 KHz. The number of offset options in such a case will be 12. The number of offsets may be determined using methods described with reference to FIG. 4B. The fourth combination is SSB SCS being 120 KHz and the RMSI SCS being 60 KHz. The number of offset options in such a case will be 12. The number of offsets may be determined using methods described with reference to FIG. 5B.

As described in table 750, the maximum number of possible offset options is 12. In some examples, the base station may be configured indicate the offset options using 4 bits included in the PRB grid offset field. For example, the PRB grid offset field with 4-bits may be sufficient to encode all offset values counted in number of subcarriers in default DL numerology. In some examples, the 4 bits may be used to convey extra information if jointly encoded with another field (such as, an RMSI config field). In some examples, the base station may be configured to jointly encode the default DL numerology field and the PRB grid offset field using 5 bits. Thus, using 5 bits, 32 possibilities may be addressed. As described with reference to FIG. 7B, there are a total of 24 maximum offset possibilities when SSB SCS is 30 KHz in sub-6 systems and when SSB SCS is 120 KHz in above-6 systems. As another example, there may be a total of 18 maximum offset possibilities when SSB SCS is 15 KHz in sub-6 systems and a total of 24 maximum offset possibilities when SSB SCS is 120 KHz in above-6 systems. Thus, when jointly encoded, the 5 bits may be configured to address both 18 and 24 offset possibilities depending on the SSB numerology. After addressing the offset possibilities, the remaining 14 entries (in case of 18 offset possibilities) or 8 entries (in case of 24 offset possibilities) in the jointly encoded field may be used for conveying extra information.

In some examples, all SSBs may not have an associated RMSI transmission. In such cases, one of the available entries in the PRB grid offset field or in the jointly encoded default DL numerology and PRB grid offset field may be configured to convey the associated RMSI transmission for that SSB. For example, the jointly encoded default DL numerology and PRB grid offset field may also be configured to convey if there are no associated RMSI transmission for that SSB.

Figure 8:
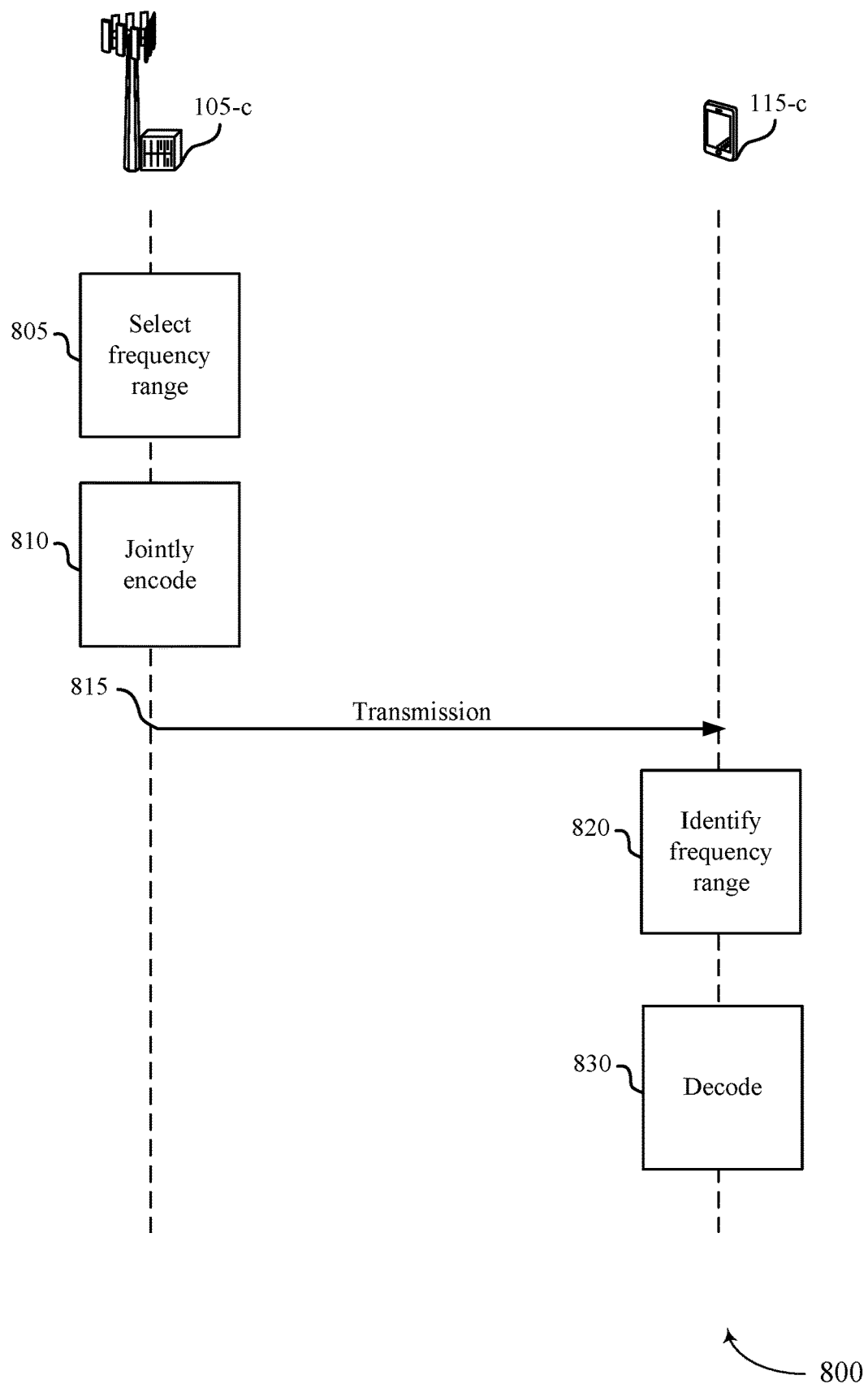
FIG. 8 illustrates an example of a process flow that supports transmission of PBCH for NR in accordance with aspects of the present disclosure.

FIG. 8 illustrates an example of a process flow 800 that supports transmission of PBCH for NR in accordance with various aspects of the present disclosure. In some examples, process flow 800 may implement aspects of wireless communications system 100. The base station 105-c may be an example of the base station 105 as described with reference to FIG. 1. Also, the UE 115-c may be an example of the UE 115 as described with reference to FIG. 1.

In the following description of the process flow 800, the operations between the base station 105-c and UE 115-c may be transmitted in a different order than the exemplary order shown, or the operations performed by base station 105-c and UE 115-c may be performed in different orders or at different times. Some operations may also be left out of the process flow 800, or other operations may be added to the process flow 800.

At 805, the base station 105-c may select between a first frequency range and a second frequency range to transmit a physical channel. In some cases, the second frequency range may be higher than the first frequency range. In some cases, the first frequency range may be sub-6 frequency range and the second frequency range may be above-6 frequency range. In some examples, the physical channel may be a PBCH.

At 810, the base station 105-c may jointly encode at least two fields of the physical channel based on the selected frequency range. For example, the base station 105-c may identify a first field and a second field to jointly encode. In one example, the first field default DL numerology field and the second field may be a PRB grid offset field of the PBCH.

At 815, the base station 105-c may transmit the PBCH to the UE 115-c. The UE 115-c may receive a transmission of a physical channel on either the first frequency range or the second frequency range.

At 820, the UE 115-c may identify the frequency range on which the physical channel was received. In some cases, the first frequency range may be sub-6 frequency range and the second frequency range may be above-6 frequency range.

At 825, the UE 115-c may decode at least two fields of the physical channel that were jointly encoded as a single field based on a frequency range used to transmit the physical channel (or PBCH). For example, the UE 115-c may identify the first as the default DL numerology field and the second field as the PRB grid offset field of the PBCH.

Figure 9:
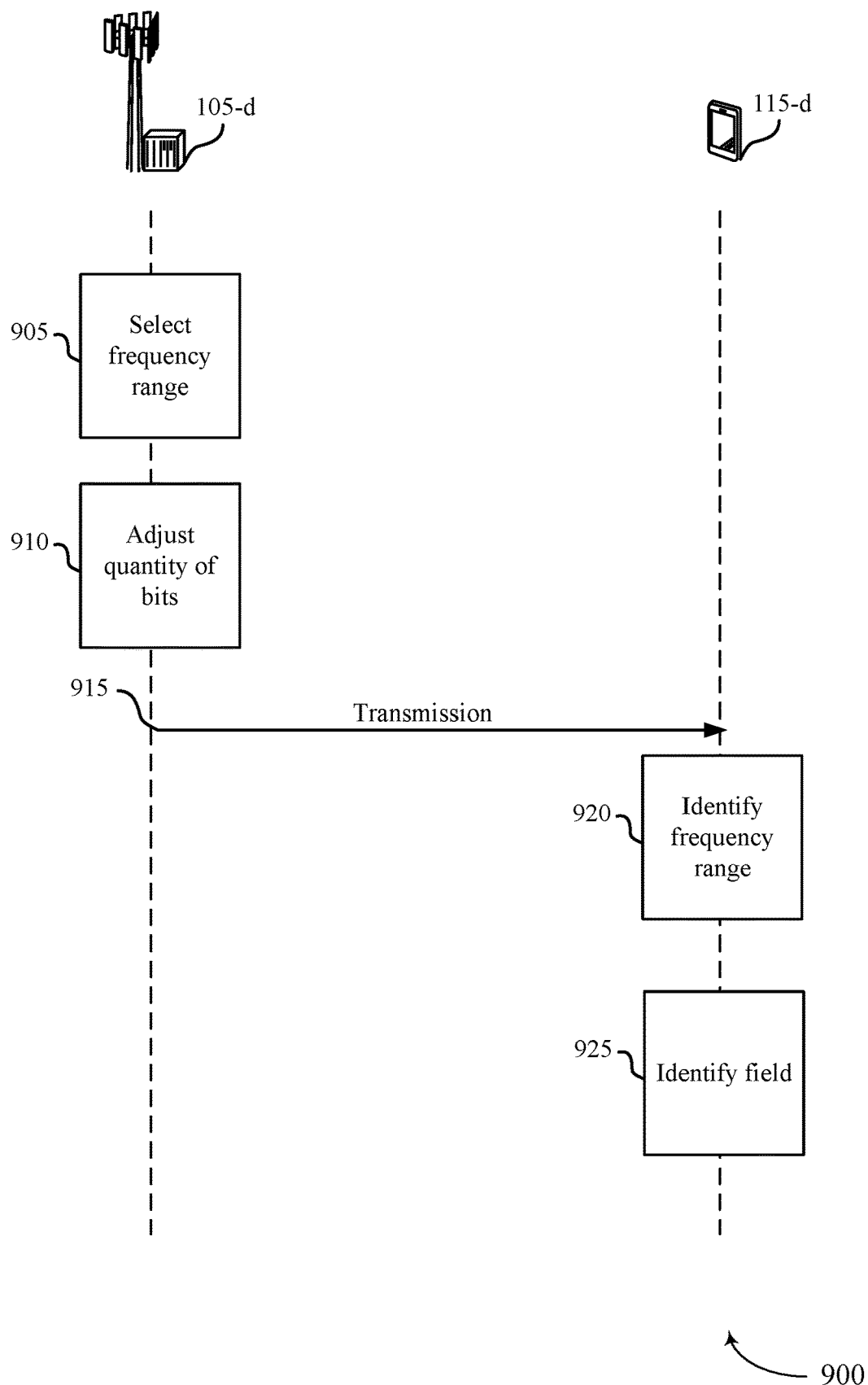
FIG. 9 illustrates an example of a process flow that supports transmission of PBCH for NR in accordance with aspects of the present disclosure.

FIG. 9 illustrates an example of a process flow 900 that supports transmission of PBCH for NR in accordance with various aspects of the present disclosure. In some examples, process flow 900 may implement aspects of wireless communications system 100. The base station 105-d may be an example of the base station 105 as described with reference to FIG. 1. Also, the UE 115-d may be an example of the UE 115 as described with reference to FIG. 1.

In the following description of the process flow 900, the operations between the base station 105-d and UE 115-d may be transmitted in a different order than the exemplary order shown, or the operations performed by base station 105-d and UE 115-d may be performed in different orders or at different times. Some operations may also be left out of the process flow 900, or other operations may be added to the process flow 900.

At 905, the base station 105-d may select between a first frequency range and a second frequency range to transmit a physical channel. In some cases, the second frequency range may be higher than the first frequency range. In some cases, the first frequency range may be sub-6 frequency range and the second frequency range may be above-6 frequency range. In some examples, the physical channel may be a PBCH.

At 910, the base station 105-d may adjust a quantity of bits associated with a field of the physical channel based on the selected frequency range. For example, upon determining that the selected frequency range in above-6, the base station 105-d may reduce the number of bits in the reserved field of the PBCH. In some examples, the reserved bit field may be used to trigger a reinterpretation of the PBCH payload in a different field structure. In some other examples, upon determining that the selected frequency range in above-6, the base station 105-d may keep the bits in the reserved field unchanged, and reduce the number of bits in the RMSI config field of the PBCH.

At 915, the base station 105-d may transmit the PBCH to the UE 115-d. The UE 115-d may receive a transmission of a physical channel on either the first frequency range or the second frequency range.

At 920, the UE 115-c may identify the received transmission of a physical channel as being received on a first frequency range or a second frequency range. In some cases, the first frequency range may be sub-6 frequency range and the second frequency range may be above-6 frequency range.

At 925, the UE 115-c may identify a field of the physical channel that includes an adjusted quantity of bits based on the identified frequency range. For example, the UE 115-d may identify that the reserved field includes an adjusted quantity of bits. In some other cases, the UE 115-d may identify that the RMSI config field includes an adjusted quantity of bits.

Figure 10:
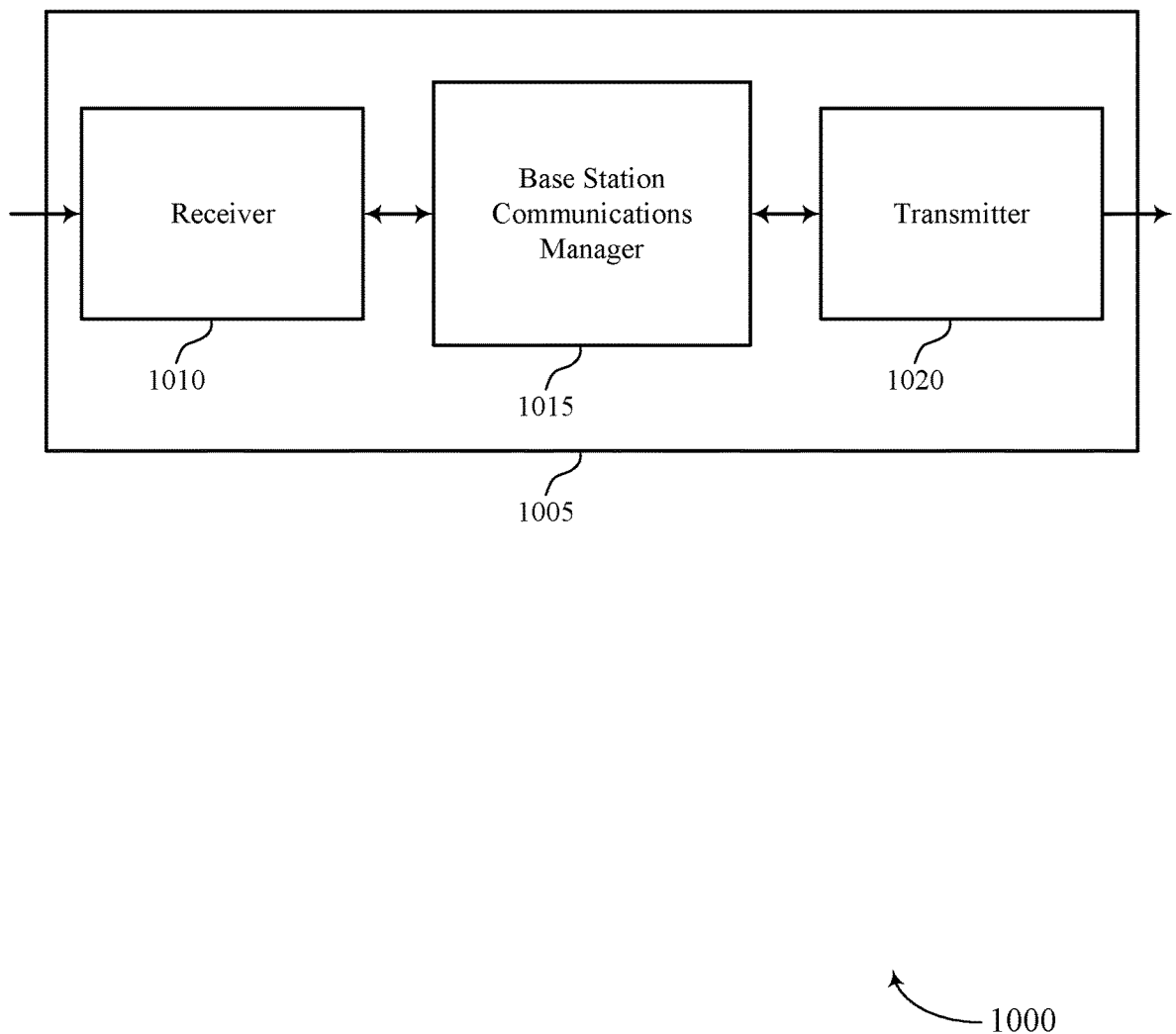
FIGS. 10 through 12 show block diagrams of a device that supports transmission of PBCH for NR in accordance with aspects of the present disclosure.

FIG. 10 shows a block diagram 1000 of a wireless device 1005 that supports transmission of PBCH for NR in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to transmission of PBCH for NR, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may select between a first frequency range and a second frequency range to transmit a physical channel. In some cases, the second frequency range is higher than the first frequency range. The base station communications manager 1015 may jointly encode at least two fields of the physical channel based on the selected frequency range. The base station communications manager 1015 may also adjust a quantity of bits associated with a field of the physical channel based on the selected frequency range.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
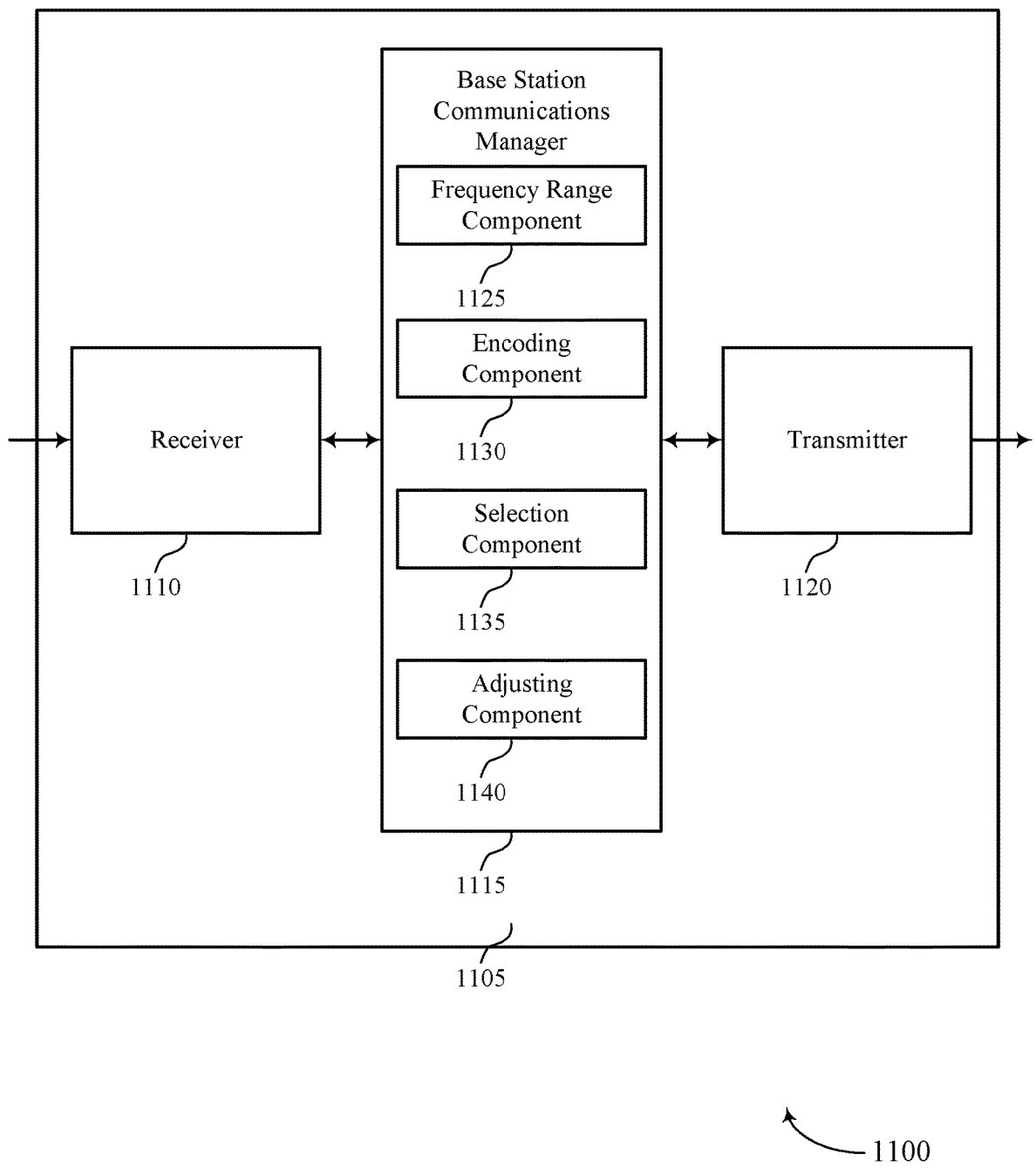

FIG. 11 shows a block diagram 1100 of a wireless device 1105 that supports transmission of PBCH for NR in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to transmission of PBCH for NR, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include frequency range component 1125, encoding component 1130, selection component 1135, and adjusting component 1140.

Frequency range component 1125 may select between a first frequency range and a second frequency range to transmit a physical channel. In some cases, the second frequency range is higher than the first frequency range. In some cases, the first frequency range includes 15 kHz or 30 kHz SCS and the second frequency range includes 60 kHz or 120 kHz SCS for RMSI transmission. In some cases, the first frequency range includes 15 kHz or 30 kHz SCS and the second frequency range includes 120 kHz or 240 kHz SCS for SSB transmission. In some cases, the physical channel includes a PBCH.

Encoding component 1130 may jointly encode at least two fields of the physical channel based on the selected frequency range. In some examples, the encoding component 1130 may jointly encode a default DL numerology field with a PRB grid offset field of the physical channel. In some cases, the encoding component 1130 may jointly encode the at least two fields of the physical channel using 5 bits. In some examples, a field from the at least two fields of the physical channel or a jointly encoded field of the physical channel may include an indication of an RMSI associated with an SSB. For example, one or more SSBs may not have an RMSI transmission associated with them. In such cases, one of the available bits in the PRB grid offset field or in the jointly encoded default DL numerology and PRB grid offset field may be configured to convey if there are no associated RMSI transmission for that SSB.

Selection component 1135 may select between a first frequency range and a second frequency range to transmit a physical channel, the second frequency range being higher than the first frequency range. In some cases, the first frequency range includes 15 kHz or 30 kHz SCS and the second frequency range includes 60 kHz or 120 kHz SCS for RMSI transmission. In some cases, the first frequency range includes 15 kHz or 30 kHz SCS and the second frequency range includes 120 kHz or 240 kHz SCS for SSB transmission.

Adjusting component 1140 may adjust a quantity of bits associated with a field of the physical channel based on the selected frequency range and relatively reduce the quantity of bits associated with the field of the physical channel.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

FIG. 12 shows a block diagram 1200 of a base station communications manager 1215 that supports transmission of PBCH for NR in accordance with aspects of the present disclosure. The base station communications manager 1215 may be an example of aspects of a base station communications manager 1015, a base station communications manager 1115, or a base station communications manager 1315 described with reference to FIGS. 10, 11, and 13. The base station communications manager 1215 may include frequency range component 1220, encoding component 1225, selection component 1230, adjusting component 1235, numerology component 1240, and field identification component 1245. Each of these modules may communicate, directly or indirectly, with one another (e.g., via one or more buses).

Frequency range component 1220 may select between a first frequency range and a second frequency range to transmit a physical channel. In some cases, the second frequency range is higher than the first frequency range. In some cases, the first frequency range includes 15 kHz or 30 kHz SCS and the second frequency range includes 60 kHz or 120 kHz SCS for RMSI transmission. In some cases, the first frequency range includes 15 kHz or 30 kHz SCS and the second frequency range includes 120 kHz or 240 kHz SCS for SSB transmission. In some cases, the physical channel includes a PBCH.

Encoding component 1225 may jointly encode at least two fields of the physical channel based on the selected frequency range. In some examples, the encoding component 1225 may jointly encode a default DL numerology field with a PRB grid offset field of the physical channel. In some cases, the encoding component 1225 may jointly encode the at least two fields of the physical channel using 5 bits. In some examples, a field from the at least two fields of the physical channel or a jointly encoded field of the physical channel may include an indication of an RMSI associated with an SSB.

Selection component 1230 may also select between a first frequency range and a second frequency range to transmit a physical channel, the second frequency range being higher than the first frequency range. In some cases, the first frequency range may be a sub-6 frequency range and the second frequency range may be an above-6 (or mmW) frequency range. After selection, the selection component 1230 may send the selected frequency range to adjusting component 1235. In some cases, the first frequency range includes 15 kHz or 30 kHz SCS and the second frequency range includes 60 kHz or 120 kHz SCS for RMSI transmission. In some cases, the first frequency range includes 15 kHz or 30 kHz SCS and the second frequency range includes 120 kHz or 240 kHz SCS for SSB transmission.

Adjusting component 1235 may adjust a quantity of bits associated with a field of the physical channel based on the selected frequency range. In some cases, the adjusting component 1235 may relatively reduce the quantity of bits associated with the field of the physical channel.

Numerology component 1240 may identify a numerology of an SSB. In some cases, 5 bits may indicate a numerology of an RMSI and an offset between an SSB RB grid and a common PRB grid. In some cases, the 5 bits may indicate a subset of possible offsets between the SSB RB grid and the common PRB grid based on the identified numerology of the SSB and the numerology of the RMSI. In some cases, the numerology of the RMSI indicates an SCS of the physical channel carrying the RMSI in the first frequency range or an SCS of the physical channel carrying the RMSI in the second frequency range.

Field identification component 1245 may identify a field in the physical channel. In some cases, the physical channel is a PBCH. In some cases, the field includes a field of reserved bits of the physical channel. In some cases, the field includes an RMSI related configuration field. In some examples, the field of reserved bits of the physical channel includes an indication of a field structure associated with the physical channel.

Figure 13:
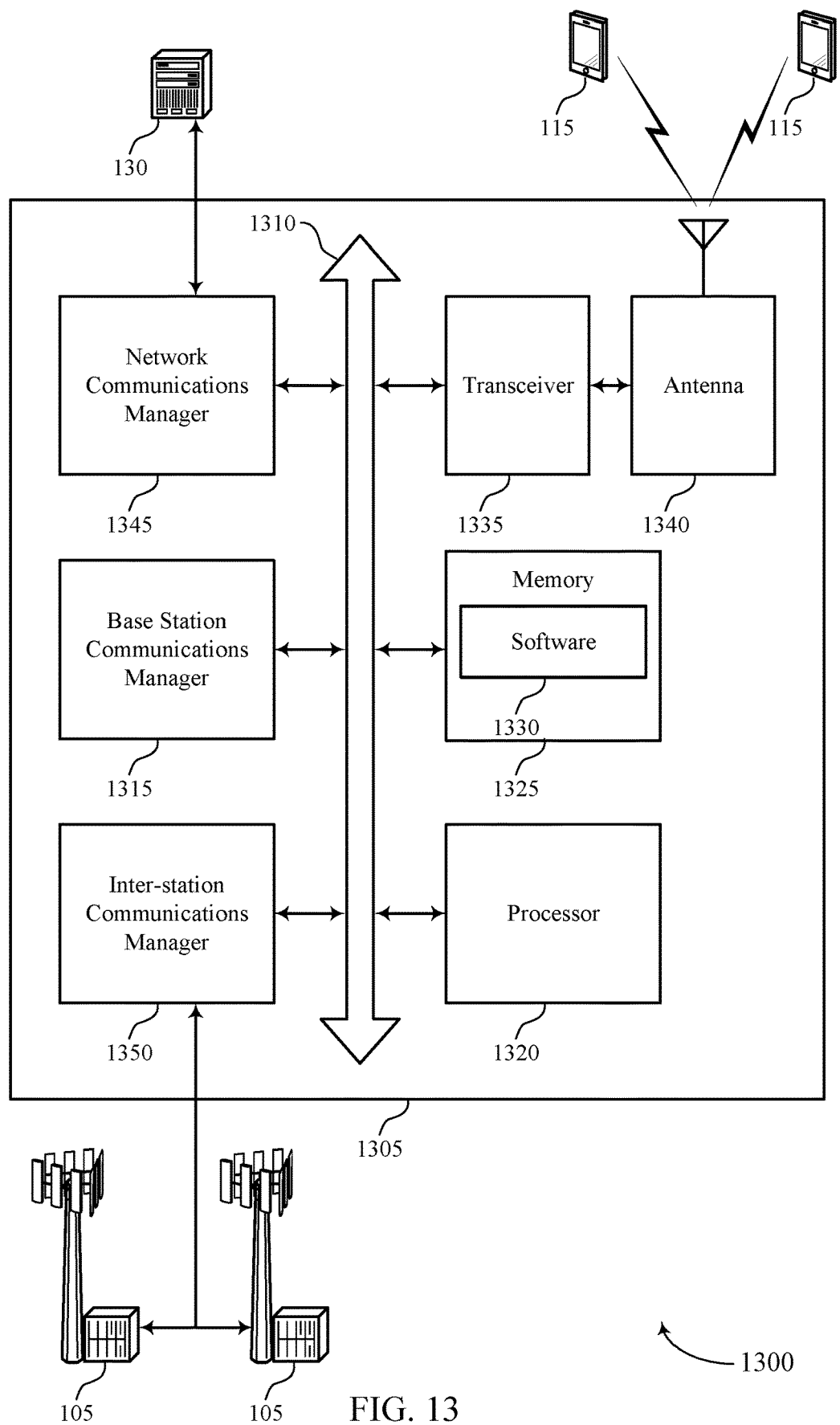
FIG. 13 illustrates a block diagram of a system including a base station that supports transmission of PBCH for NR in accordance with aspects of the present disclosure.

FIG. 13 shows a diagram of a system 1300 including a device 1305 that supports transmission of PBCH for NR in accordance with aspects of the present disclosure. Device 1305 may be an example of or include the components of wireless device 1005, wireless device 1105, or a base station 105 as described above, e.g., with reference to FIGS. 10 and 11. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting transmission of PBCH for NR).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support transmission of PBCH for NR. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
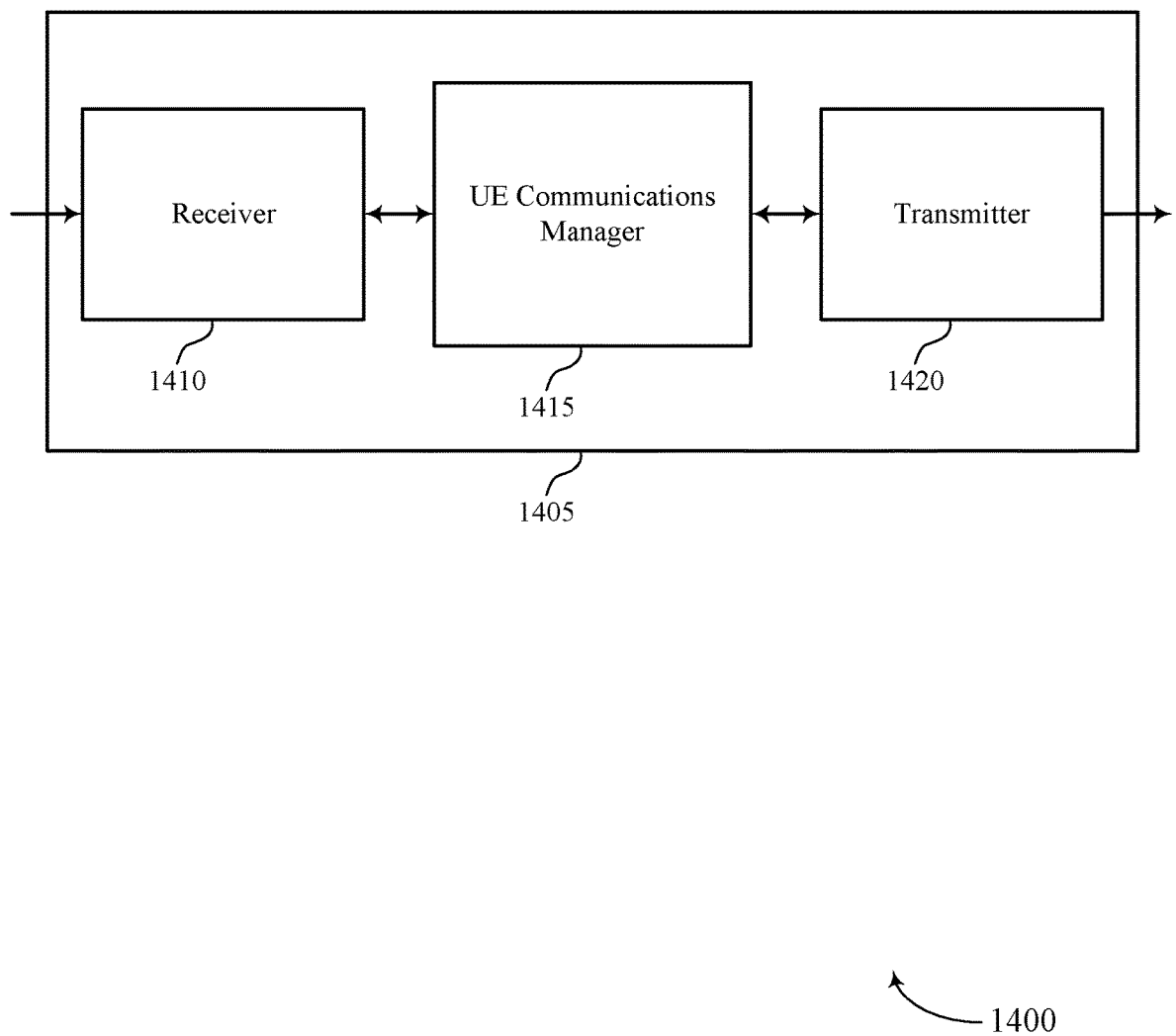
FIGS. 14 through 16 show block diagrams of a device that supports transmission of PBCH for NR in accordance with aspects of the present disclosure.

FIG. 14 shows a block diagram 1400 of a wireless device 1405 that supports transmission of PBCH for NR in accordance with aspects of the present disclosure. Wireless device 1405 may be an example of aspects of a UE 115 as described herein. Wireless device 1405 may include receiver 1410, UE communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to transmission of PBCH for NR, etc.). Information may be passed on to other components of the device. The receiver 1410 may be an example of aspects of the transceiver 1735 described with reference to FIG. 17. The receiver 1410 may utilize a single antenna or a set of antennas.

Receiver 1410 may receive a transmission of a physical channel on a first frequency range or a second frequency range, the second frequency range being higher than the first frequency range. In some cases, the physical channel includes a PBCH.

UE communications manager 1415 may be an example of aspects of the UE communications manager 1715 described with reference to FIG. 17. UE communications manager 1415 and/or at least some of its various sub-components may be implemented in hardware, software executed by a processor, firmware, or any combination thereof. If implemented in software executed by a processor, the functions of the UE communications manager 1415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1415 and/or at least some of its various sub-components may be physically located at various positions, including being distributed such that portions of functions are implemented at different physical locations by one or more physical devices. In some examples, UE communications manager 1415 and/or at least some of its various sub-components may be a separate and distinct component in accordance with various aspects of the present disclosure. In other examples, UE communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1415 may decode at least two fields of the physical channel that were jointly encoded as a single field based on a frequency range used to transmit the physical channel. The UE communications manager 1415 may also identify a received transmission of a physical channel as being received on a first frequency range or a second frequency range and identify a field of the physical channel that includes an adjusted quantity of bits based on the identified frequency range. In some cases, the second frequency range is higher than the first frequency range.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
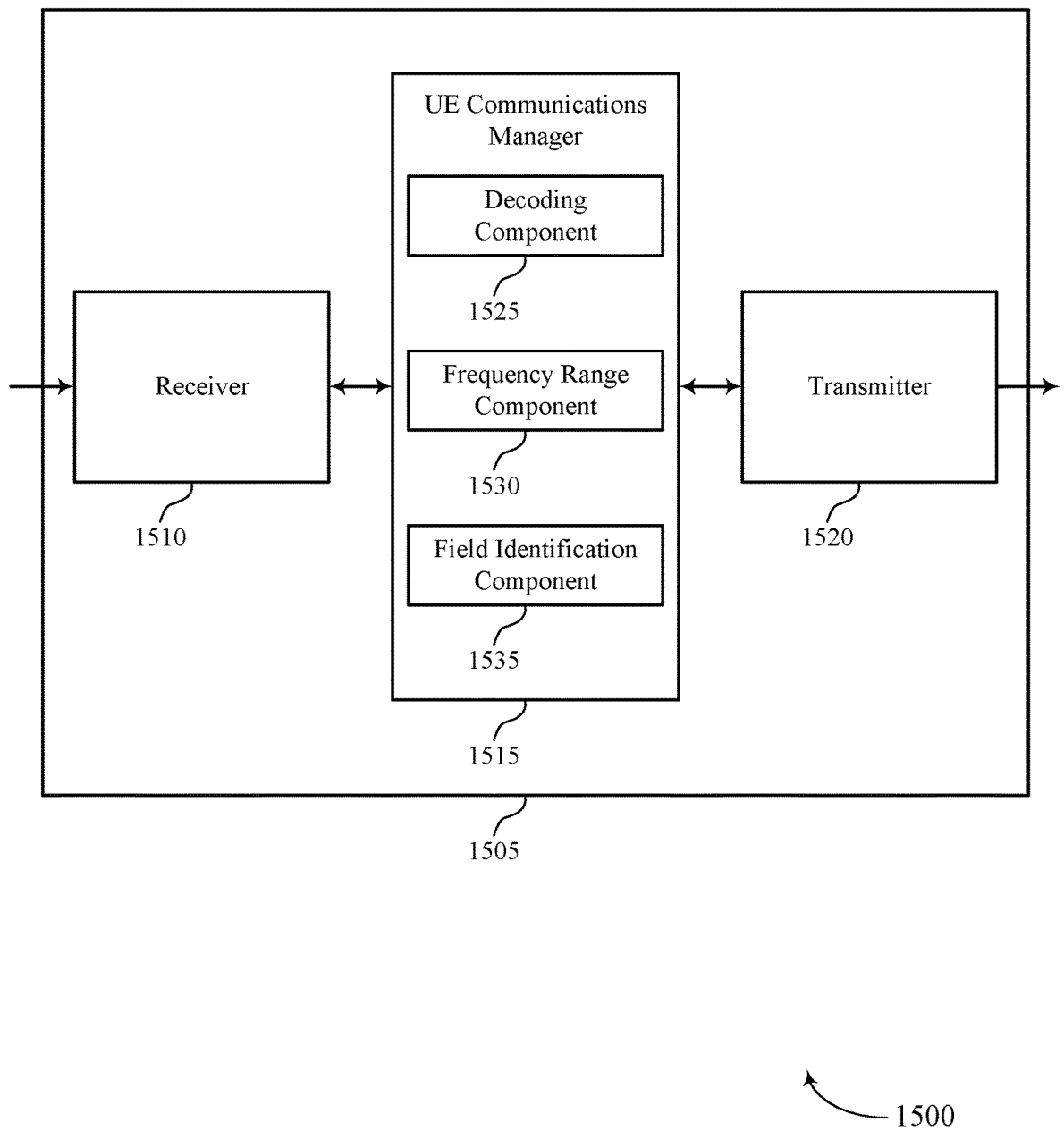

FIG. 15 shows a block diagram 1500 of a wireless device 1505 that supports transmission of PBCH for NR in accordance with aspects of the present disclosure. Wireless device 1505 may be an example of aspects of a wireless device 1405 or a UE 115 as described with reference to FIG. 14. Wireless device 1505 may include receiver 1510, UE communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to transmission of PBCH for NR, etc.). Information may be passed on to other components of the device. The receiver 1510 may be an example of aspects of the transceiver 1735 described with reference to FIG. 17. The receiver 1510 may utilize a single antenna or a set of antennas.

UE communications manager 1515 may be an example of aspects of the UE communications manager 1715 described with reference to FIG. 17. UE communications manager 1515 may also include decoding component 1525, frequency range component 1530, and field identification component 1535.

Decoding component 1525 may decode at least two fields of the physical channel that were jointly encoded as a single field based on a frequency range used to transmit the physical channel. In some cases, the at least two fields include a default DL numerology field and a PRB grid offset field. In some cases, at least two fields are jointly encoded using 5 bits. In some examples, a field from the at least two fields of the physical channel or the jointly encoded field of the physical channel may include an indication of an RMSI associated with an SSB.

Frequency range component 1530 may identify a received transmission of a physical channel as being received on a first frequency range or a second frequency range. In some cases, the second frequency range is higher than the first frequency range. In some cases, the first frequency range includes 15 kHz or 30 kHz SCS and the second frequency range includes 60 kHz or 120 kHz SCS for RMSI transmission. In some cases, the first frequency range includes 15 kHz or 30 kHz SCS and the second frequency range includes 120 kHz or 240 kHz SCS for SSB transmission.

Field identification component 1535 may identify a field of the physical channel that includes an adjusted quantity of bits based on the identified frequency range. In some cases, the field includes a field of reserved bits of the physical channel. In some examples, the field of reserved bits of the physical channel includes an indication of a field structure associated with the physical channel. In some cases, the field includes an RMSI related configuration field.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
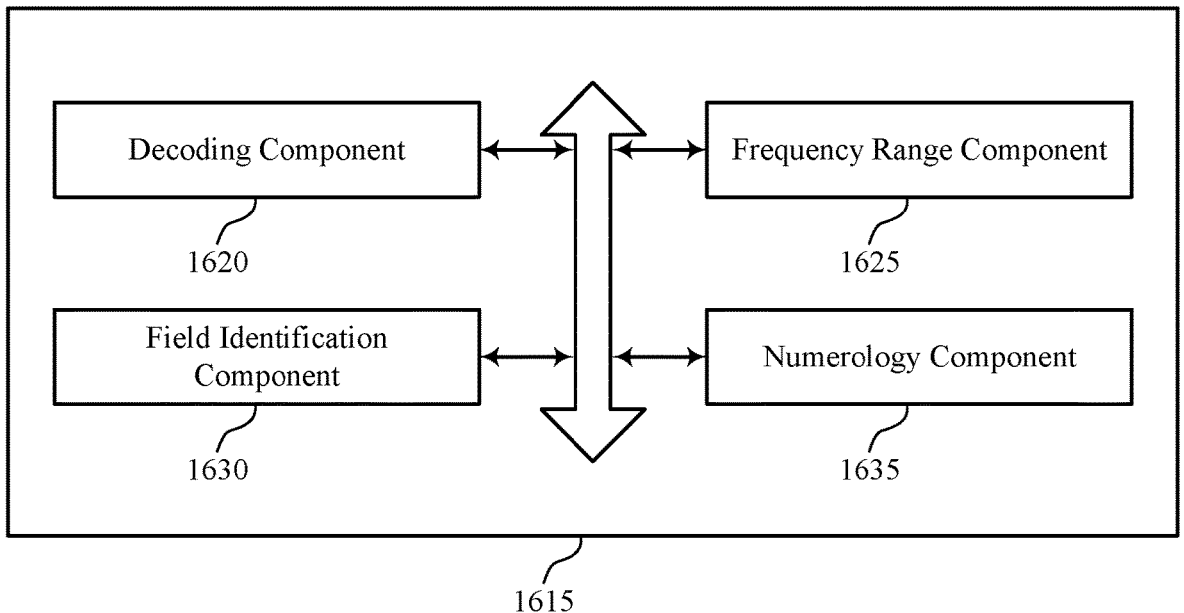

FIG. 16 shows a block diagram 1600 of a UE communications manager 1615 that supports transmission of PBCH for NR in accordance with aspects of the present disclosure. The UE communications manager 1615 may be an example of aspects of a UE communications manager 1715 described with reference to FIGS. 14, 15, and 17. The UE communications manager 1615 may include decoding component 1620, frequency range component 1625, field identification component 1630, and numerology component 1635. Each of these modules may communicate, directly or indirectly, with one another (e.g., via one or more buses).

Decoding component 1620 may decode at least two fields of the physical channel that were jointly encoded as a single field based on a frequency range used to transmit the physical channel. In some cases, the at least two fields include a default DL numerology field and a PRB grid offset field. In some cases, at least two fields are jointly encoded using 5 bits.

Frequency range component 1625 may identify a received transmission of a physical channel as being received on a first frequency range or a second frequency range, the second frequency range being higher than the first frequency range. In some cases, the first frequency range includes 15 kHz or 30 kHz subcarrier spacing (SCS) and the second frequency range includes 60 kHz or 120 kHz SCS for RMSI transmission. In some cases, the first frequency range includes 15 kHz or 30 kHz SCS and the second frequency range includes 120 kHz or 240 kHz SCS for SSB transmission.

Field identification component 1630 may identify a field of the physical channel that includes an adjusted quantity of bits based on the identified frequency range. In some cases, the field includes a field of reserved bits of the physical channel. In some examples, the field of reserved bits of the physical channel includes an indication of a field structure associated with the physical channel. In some cases, the field includes an RMSI related configuration field.

Numerology component 1635 may identify a numerology of an RMSI and an offset between an SSB RB grid and a common PRB grid based on the 5 bits.

Figure 17:
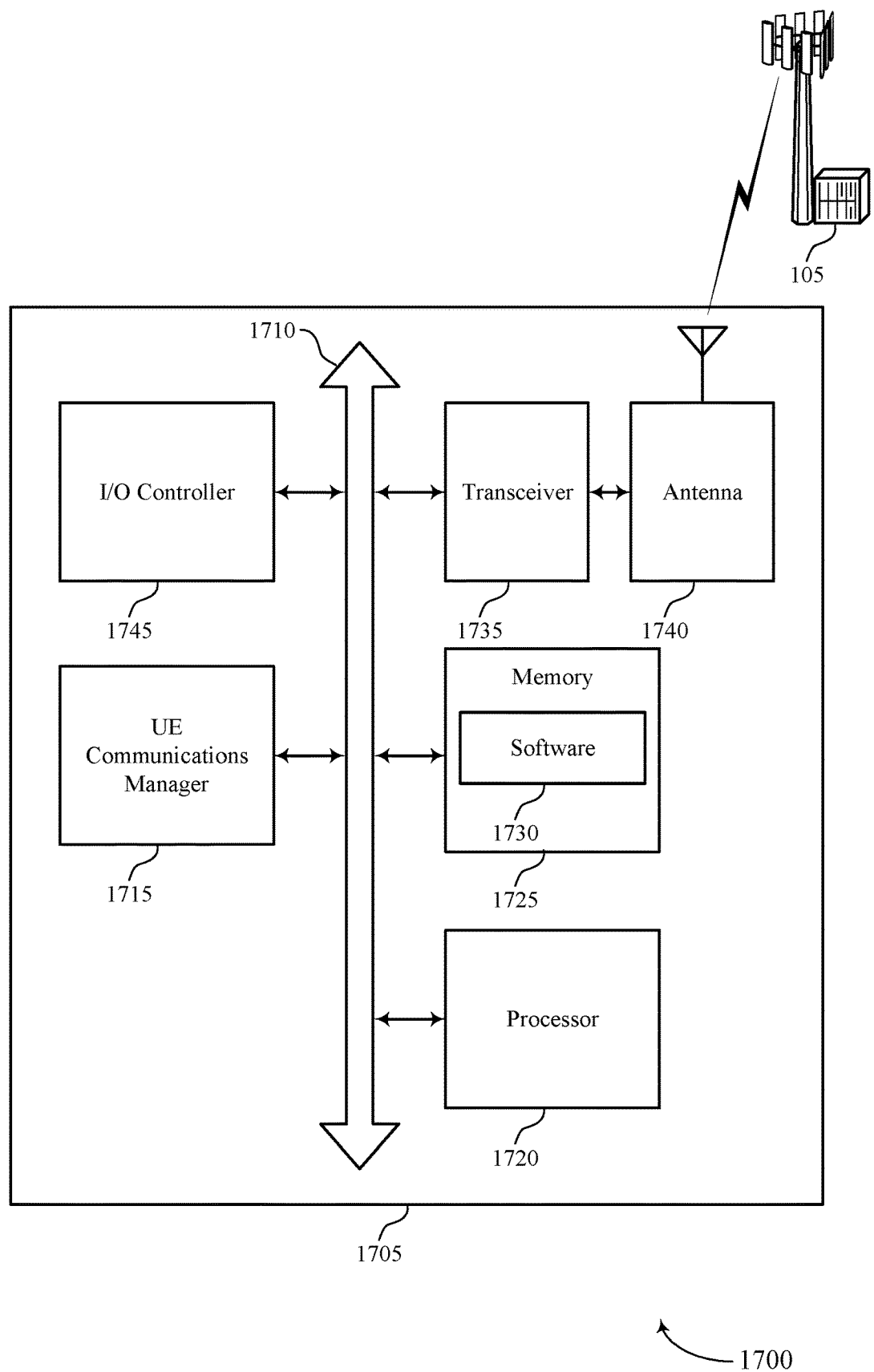
FIG. 17 illustrates a block diagram of a system including a UE that supports transmission of PBCH for NR in accordance with aspects of the present disclosure.

FIG. 17 shows a diagram of a system 1700 including a device 1705 that supports transmission of PBCH for NR in accordance with aspects of the present disclosure. Device 1705 may be an example of or include the components of UE 115 as described above, e.g., with reference to FIG. 1. Device 1705 may include components for bi-directional voice and data communications including components for transmitting and receiving communications, including UE communications manager 1715, processor 1720, memory 1725, software 1730, transceiver 1735, antenna 1740, and I/O controller 1745. These components may be in electronic communication via one or more buses (e.g., bus 1710). Device 1705 may communicate wirelessly with one or more base stations 105.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting transmission of PBCH for NR).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support transmission of PBCH for NR. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

I/O controller 1745 may manage input and output signals for device 1705. I/O controller 1745 may also manage peripherals not integrated into device 1705. In some cases, I/O controller 1745 may represent a physical connection or port to an external peripheral. In some cases, I/O controller 1745 may utilize an operating system such as iOS®, ANDROID®, MS-DOS®, MS-WINDOWS®, OS/2®, UNIX®, LINUX®, or another known operating system. In other cases, I/O controller 1745 may represent or interact with a modem, a keyboard, a mouse, a touchscreen, or a similar device. In some cases, I/O controller 1745 may be implemented as part of a processor. In some cases, a user may interact with device 1705 via I/O controller 1745 or via hardware components controlled by I/O controller 1745.

Figure 18:
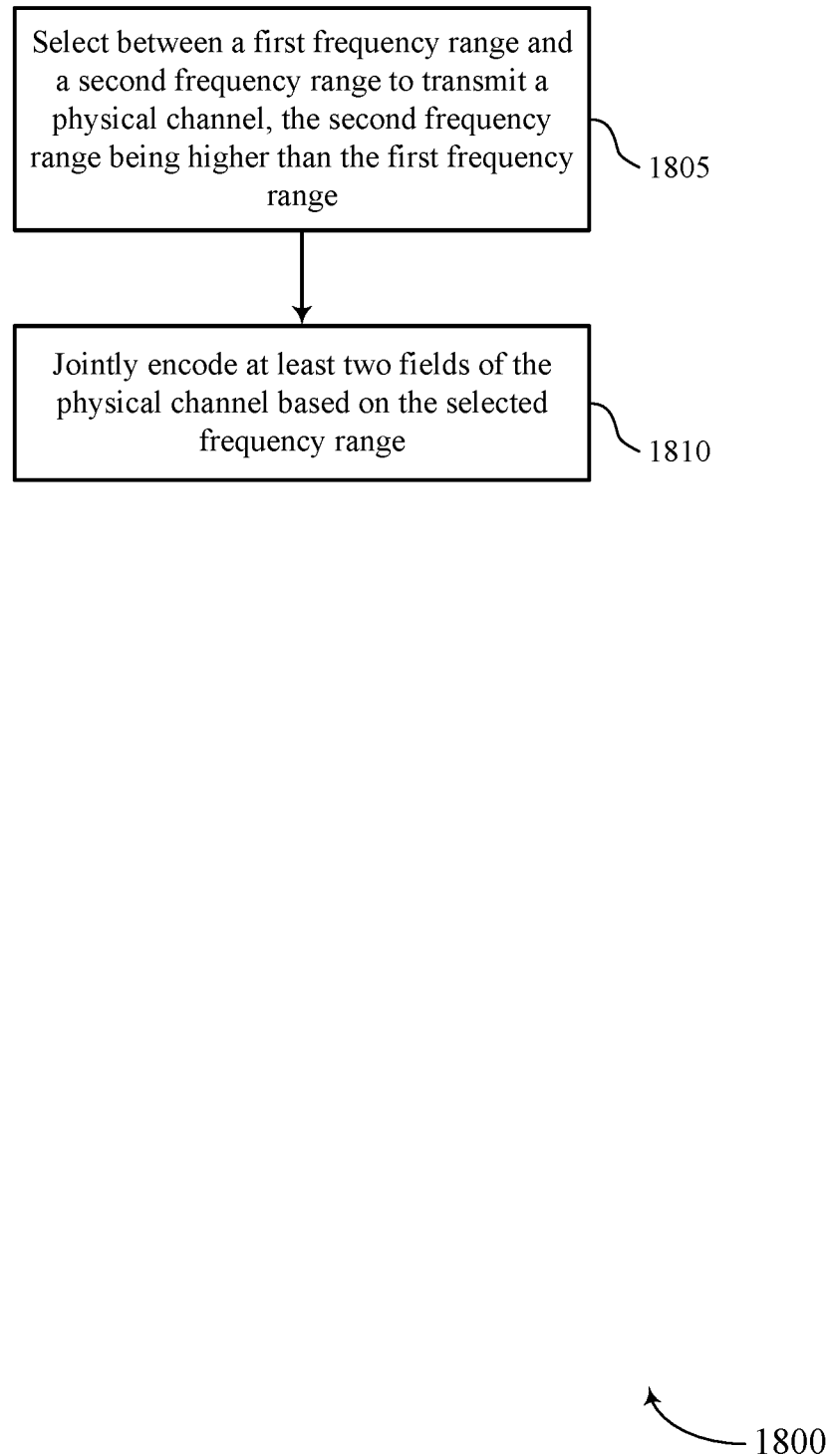
FIGS. 18 through 22 illustrate methods for transmission of PBCH for NR in accordance with aspects of the present disclosure.

FIG. 18 shows a flowchart illustrating a method 1800 for transmission of PBCH for NR in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may select between a first frequency range and a second frequency range to transmit a physical channel, the second frequency range being higher than the first frequency range. The operations of 1805 may be performed according to the methods described herein. In some examples, aspects of the operations of 1805 may be performed by a frequency range component as described with reference to FIGS. 10 through 13.

At 1810 the base station 105 may jointly encode at least two fields of the physical channel based on the selected frequency range. The operations of 1810 may be performed according to the methods described herein. In some examples, aspects of the operations of 1810 may be performed by an encoding component as described with reference to FIGS. 10 through 13.

Figure 19:
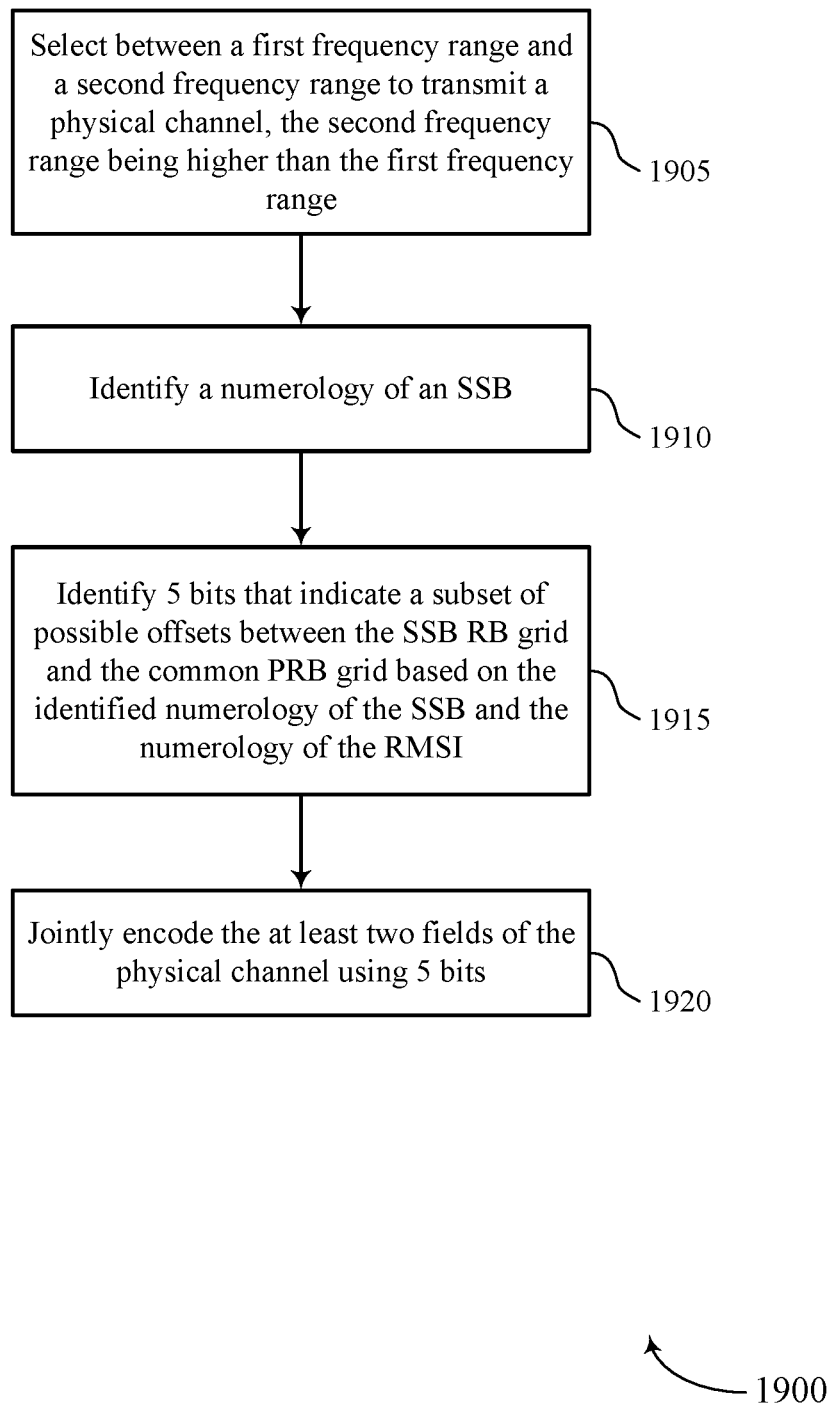

FIG. 19 shows a flowchart illustrating a method 1900 for transmission of PBCH for NR in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may select between a first frequency range and a second frequency range to transmit a physical channel, the second frequency range being higher than the first frequency range. The operations of 1905 may be performed according to the methods described herein. In some examples, aspects of the operations of 1905 may be performed by a frequency range component as described with reference to FIGS. 10 through 13.

At 1910 the base station 105 may identify a numerology of an SSB. The operations of 1910 may be performed according to the methods described herein. In some examples, aspects of the operations of 1910 may be performed by a numerology component as described with reference to FIGS. 10 through 13.

At 1915 the base station 105 may identify the 5 bits that indicate a subset of possible offsets between the SSB RB grid and the common PRB grid based on the identified numerology of the SSB and the numerology of the RMSI. The operations of 1915 may be performed according to the methods described herein. In some examples, aspects of the operations of 1915 may be performed by a numerology component as described with reference to FIGS. 10 through 13.

At 1920 the base station 105 may jointly encode the at least two fields of the physical channel using the 5 bits. The operations of 1920 may be performed according to the methods described herein. In some examples, aspects of the operations of 1920 may be performed by an encoding component as described with reference to FIGS. 10 through 13.

Figure 20:
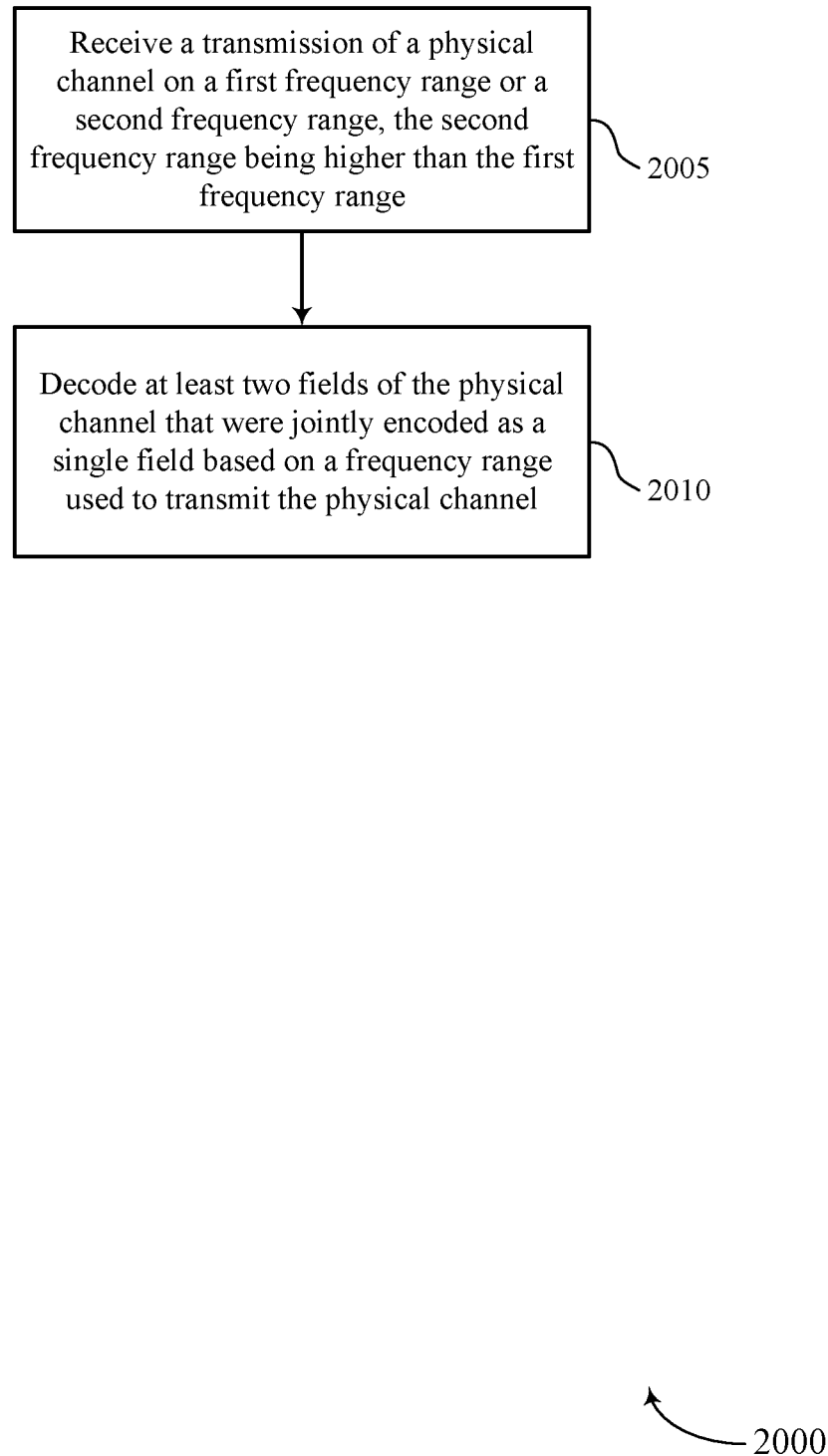

FIG. 20 shows a flowchart illustrating a method 2000 for transmission PBCH for NR in accordance with aspects of the present disclosure. The operations of method 2000 may be implemented by a UE 115 or its components as described herein. For example, the operations of method 2000 may be performed by a UE communications manager as described with reference to FIGS. 14 through 17. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may receive a transmission of a physical channel on a first frequency range or a second frequency range. In some cases, the second frequency range is higher than the first frequency range. The operations of 2005 may be performed according to the methods described herein. In some examples, aspects of the operations of 2005 may be performed by a receiver as described with reference to FIGS. 14 through 17.

At 2010 the UE 115 may decode at least two fields of the physical channel that were jointly encoded as a single field based on a frequency range used to transmit the physical channel. The operations of 2010 may be performed according to the methods described herein. In some examples, aspects of the operations of 2010 may be performed by a decoding component as described with reference to FIGS. 14 through 17.

Figure 21:
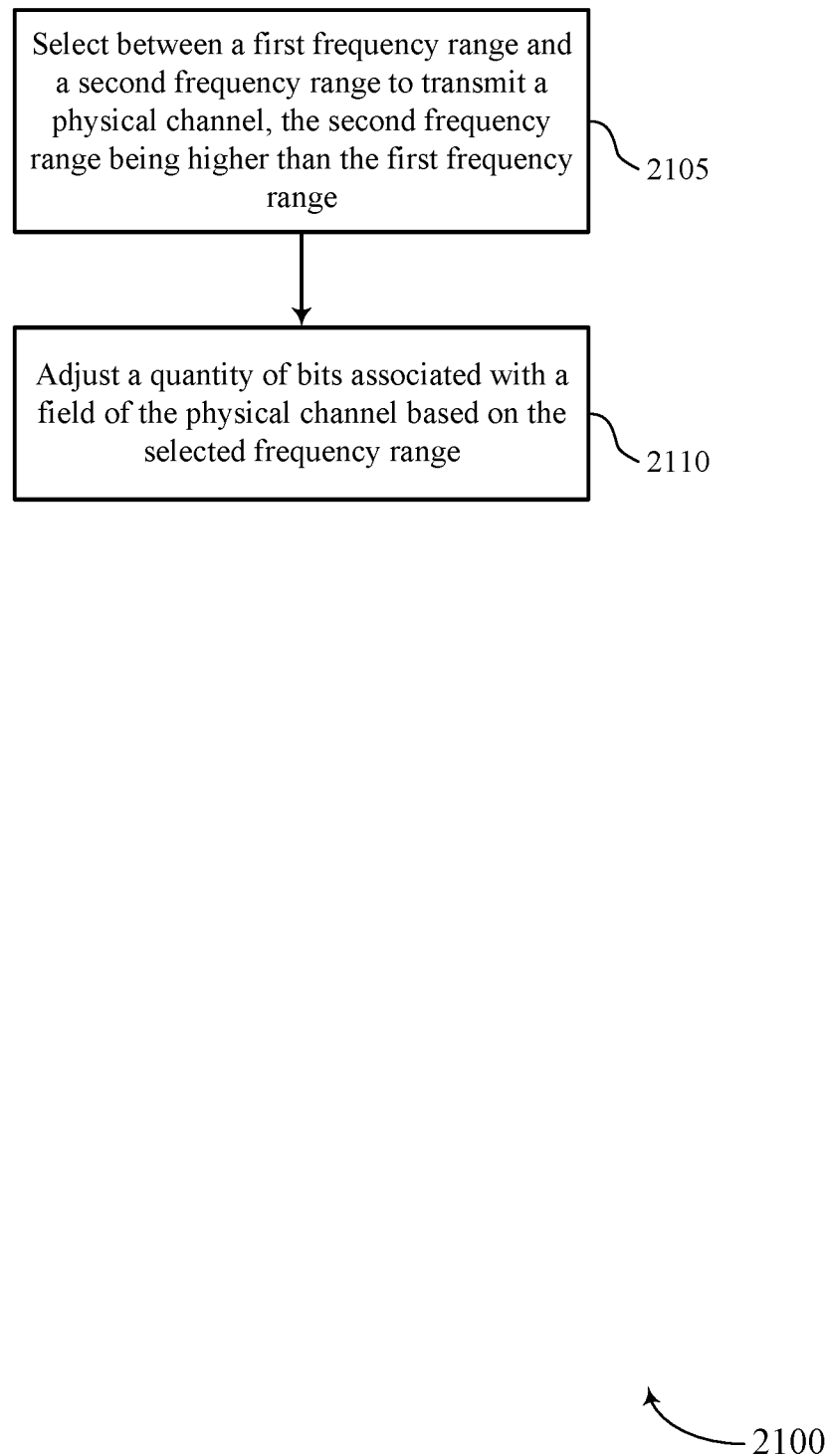

FIG. 21 shows a flowchart illustrating a method 2100 for transmission of PBCH for NR in accordance with aspects of the present disclosure. The operations of method 2100 may be implemented by a base station 105 or its components as described herein. For example, the operations of method 2100 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may select between a first frequency range and a second frequency range to transmit a physical channel, the second frequency range being higher than the first frequency range. The operations of 2105 may be performed according to the methods described herein. In some examples, aspects of the operations of 2105 may be performed by a selection component as described with reference to FIGS. 10 through 13.

At 2110 the base station 105 may adjust a quantity of bits associated with a field of the physical channel based on the selected frequency range. The operations of 2110 may be performed according to the methods described herein. In some examples, aspects of the operations of 2110 may be performed by a adjusting component as described with reference to FIGS. 10 through 13.

Figure 22:
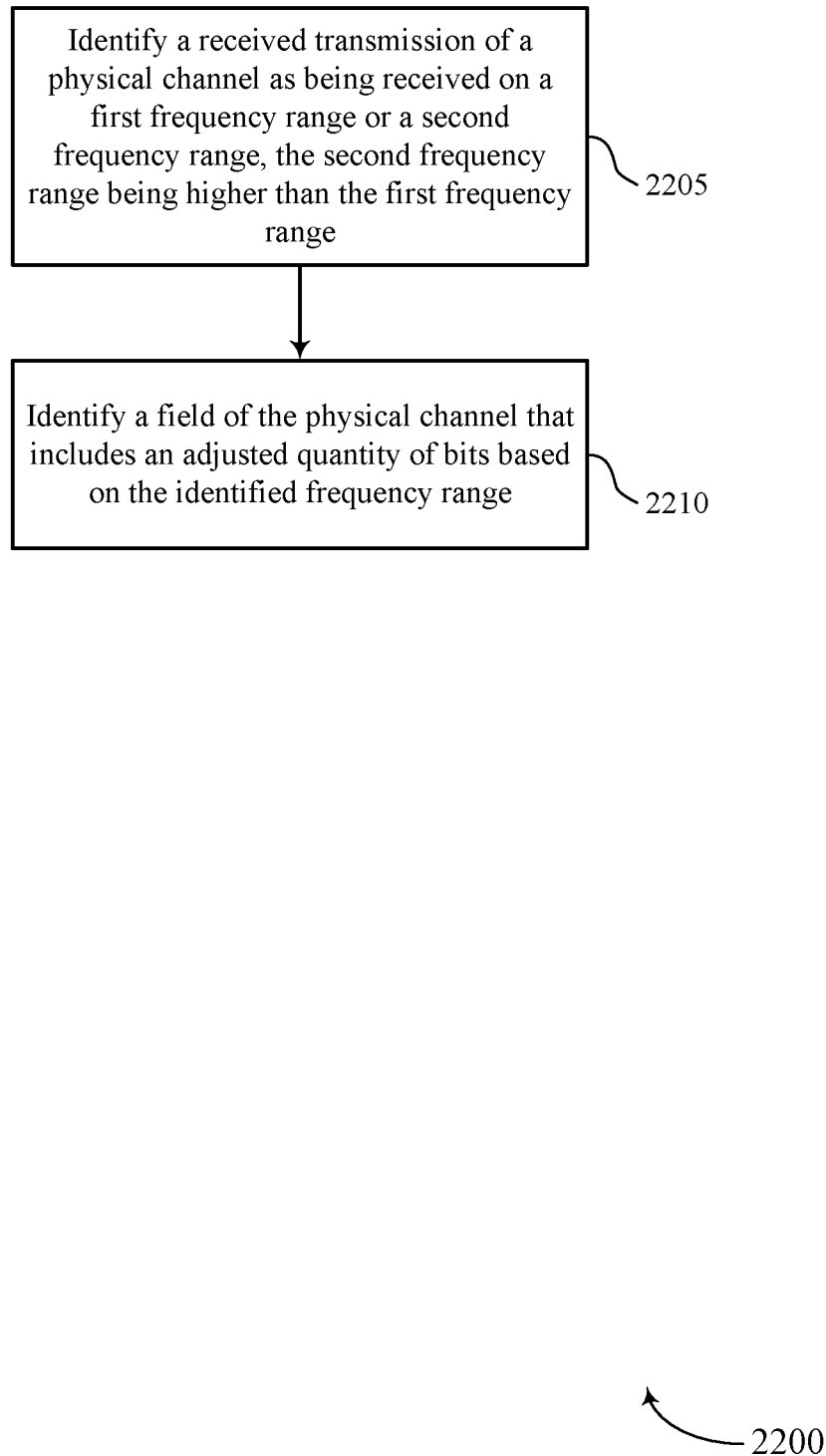

FIG. 22 shows a flowchart illustrating a method 2200 for transmission of PBCH for NR in accordance with aspects of the present disclosure. The operations of method 2200 may be implemented by a UE 115 or its components as described herein. For example, the operations of method 2200 may be performed by a UE communications manager as described with reference to FIGS. 14 through 17. In some examples, a UE 115 may execute a set of codes to control the functional elements of the device to perform the functions described below. Additionally or alternatively, the UE 115 may perform aspects of the functions described below using special-purpose hardware.

At 2205 the UE 115 may identify a received transmission of a physical channel as being received on a first frequency range or a second frequency range. In some cases, the second frequency range is higher than the first frequency range. The operations of 2205 may be performed according to the methods described herein. In some examples, aspects of the operations of 2205 may be performed by a frequency range component as described with reference to FIGS. 14 through 17.

At 2210 the UE 115 may identify a field of the physical channel that includes an adjusted quantity of bits based on the identified frequency range. The operations of 2210 may be performed according to the methods described herein. In some examples, aspects of the operations of 2210 may be performed by a field identification component as described with reference to FIGS. 14 through 17.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   selecting between a first frequency range and a second frequency range to transmit a physical channel, wherein the second frequency range comprises an above-6 GHz frequency range and the first frequency range comprises a sub-6 GHz frequency range; and
   jointly encoding at least two fields of the physical channel based at least in part on the selected frequency range, wherein a field from the at least two fields of the physical channel comprises an indication of a remaining system information (RMSI) associated with a sync signal block (SSB).

2. The method of claim 1, wherein jointly encoding the at least two fields comprises:
   jointly encoding a default downlink (DL) numerology field with a physical resource block (PRB) grid offset field of the physical channel.

3. The method of claim 1, further comprising:
   jointly encoding the at least two fields of the physical channel using 5 bits.

4. The method of claim 3, wherein the 5 bits indicate a numerology of the RMSI and an offset between an SSB resource block (RB) grid and a common physical resource block (PRB) grid.

5. The method of claim 4, further comprising:
   identifying a numerology of the SSB.

6. The method of claim 5, wherein the 5 bits indicate a subset of possible offsets between the SSB RB grid and the common PRB grid based at least in part on the identified numerology of the SSB and the numerology of the RMSI.

7. The method of claim 4, wherein the numerology of the RMSI indicates a subcarrier spacing (SCS) of the physical channel carrying the RMSI in the first frequency range or an SCS of the physical channel carrying the RMSI in the second frequency range.

8. The method of claim 1, wherein one or more available bits in a physical resource block (PRB) grid offset field comprises a second indication of no RMSI being associated with the SSB.

9. The method of claim 1, wherein a subcarrier spacing of the first frequency range is 15 kHz or 30 kHz and the subcarrier spacing of the second frequency range is 60 kHz or 120 kHz.

10. The method of claim 1, wherein the physical channel comprises a physical broadcast channel (PBCH).

11. A method for wireless communication, comprising:
    receiving a transmission of a physical channel on a first frequency range or a second frequency range, wherein the second frequency range comprises an above-6 GHz frequency range and the first frequency range comprises a sub-6 GHz frequency range; and
    decoding at least two fields of the physical channel that were jointly encoded based at least in part on a frequency range used to transmit the physical channel, wherein a field from the at least two fields of the physical channel comprises an indication of a remaining system information (RMSI) associated with a sync signal block (SSB).

12. The method of claim 11, wherein the at least two fields comprise a default downlink (DL) numerology field and a physical resource block (PRB) grid offset field.

13. The method of claim 11, wherein the at least two fields are jointly encoded using 5 bits.

14. The method of claim 13, further comprising:
identifying a numerology of an RMSI and an offset between an SSB resource block (RB) grid and a common physical resource block (PRB) grid based at least in part on the 5 bits.

15. The method of claim 11, wherein one or more available bits in a physical resource block (PRB) grid offset field comprises a second indication of no RMSI being associated with the SSB.

16. The method of claim 11, wherein a subcarrier spacing of the first frequency range is 15 kHz or 30 kHz and the subcarrier spacing of the second frequency range is 60 kHz or 120 kHz.

17. The method of claim 11, wherein the physical channel comprises a physical broadcast channel (PBCH).

18. An apparatus for wireless communication, comprising:
a processor;
memory in electronic communication with the processor; and
instructions stored in the memory and executable by the processor to cause the apparatus to:
select between a first frequency range and a second frequency range to transmit a physical channel, wherein the second frequency range comprises an above-6 GHz frequency range and the first frequency range comprises a sub-6 GHz frequency range; and
jointly encode at least two fields of the physical channel based at least in part on the selected frequency range, wherein a field from the at least two fields of the physical channel comprises an indication of a remaining system information (RMSI) associated with a sync signal block (SSB).

19. The apparatus of claim 18, wherein the instructions are further executable by the processor to cause the apparatus to:
jointly encode a default downlink (DL) numerology field with a physical resource block (PRB) grid offset field of the physical channel.

20. The apparatus of claim 18, wherein the instructions are further executable by the processor to cause the apparatus to:
jointly encode the at least two fields of the physical channel using 5 bits.

21. The apparatus of claim 20, wherein the 5 bits indicate a numerology of an RMSI and an offset between an SSB resource block (RB) grid and a common physical resource block (PRB) grid.

22. The apparatus of claim 21, wherein the instructions are further executable by the processor to cause the apparatus to:
identify a numerology of the SSB.

23. An apparatus for wireless communication, comprising:
a processor;
memory in electronic communication with the processor; and
instructions stored in the memory and executable by the processor to cause the apparatus to:
receive a transmission of a physical channel on a first frequency range or a second frequency range, wherein the second frequency range comprises an above-6 GHz frequency range and the first frequency range comprises a sub-6 GHz frequency range; and
decode at least two fields of the physical channel that were jointly encoded based at least in part on a frequency range used to transmit the physical channel, wherein a field from the at least two fields of the physical channel comprises an indication of a remaining system information (RMSI) associated with a sync signal block (SSB).

24. The apparatus of claim 23, wherein the at least two fields comprise a default downlink (DL) numerology field and a physical resource block (PRB) grid offset field.

25. The apparatus of claim 23, wherein the at least two fields are jointly encoded using 5 bits.

26. The apparatus of claim 25, wherein the instructions are further executable by the processor to cause the apparatus to:
identify a numerology of an RMSI and an offset between an SSB resource block (RB) grid and a common physical resource block (PRB) grid based at least in part on the 5 bits.

27. The apparatus of claim 23, further comprising:
a receiver in electronic communication with the processor, wherein the instructions are further executable by the processor to cause the receiver to receive the transmission of the physical channel, wherein the first frequency range comprises 15 kHz or 30 kHz subcarrier spacing (SCS) and the second frequency range comprises 60 kHz or 120 kHz SCS.

28. The apparatus of claim 23, wherein the physical channel comprises a physical broadcast channel (PBCH).

29. The apparatus of claim 18, wherein a subcarrier spacing of the first frequency range is 15 kHz or 30 kHz and the subcarrier spacing of the second frequency range is 60 kHz or 120 kHz.

30. The apparatus of claim 23, wherein a subcarrier spacing of the first frequency range is 15 kHz or 30 kHz and the subcarrier spacing of the second frequency range is 60 kHz or 120 kHz.

* * * * *